(12) United States Patent
Roth et al.

(10) Patent No.: US 9,262,642 B1
(45) Date of Patent: *Feb. 16, 2016

(54) ADAPTIVE CLIENT-AWARE SESSION SECURITY AS A SERVICE

(71) Applicant: Amazon Technologies, Inc., Reno, NV (US)

(72) Inventors: Gregory Branchek Roth, Seattle, WA (US); Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,048

(22) Filed: Jan. 13, 2014

(51) Int. Cl.
*G06F 21/62* (2013.01)

(52) U.S. Cl.
CPC .................................... *G06F 21/62* (2013.01)

(58) Field of Classification Search
CPC ....... H04L 63/10; H04L 63/102; H04L 63/08; G06F 21/10; G06F 21/31; G06F 21/62
USPC ........................................................ 726/3, 28
See application file for complete search history.

(56) References Cited

U.S. PATENT DOCUMENTS

| | | | |
|---|---|---|---|
| 5,179,591 A | 1/1993 | Hardy et al. | |
| 5,200,999 A | 4/1993 | Matyas et al. | |
| 5,497,421 A | 3/1996 | Kaufman et al. | |
| 6,084,969 A | 7/2000 | Wright et al. | |
| 6,097,817 A | 8/2000 | Bilgic et al. | |
| 6,185,316 B1 | 2/2001 | Buffam | |
| 6,453,416 B1 | 9/2002 | Epstein | |
| 6,826,686 B1 | 11/2004 | Peyravian et al. | |
| 6,851,054 B2 | 2/2005 | Wheeler et al. | |
| 6,957,393 B2 | 10/2005 | Fano et al. | |
| 6,959,394 B1 | 10/2005 | Brickell et al. | |
| 6,985,583 B1 | 1/2006 | Brainard et al. | |
| 7,010,689 B1 | 3/2006 | Matyas et al. | |
| 7,073,195 B2 | 7/2006 | Brickell et al. | |
| 7,139,917 B2 | 11/2006 | Jablon | |
| 7,228,417 B2 | 6/2007 | Roskind | |

(Continued)

FOREIGN PATENT DOCUMENTS

| | | |
|---|---|---|
| WO | WO2006077822 | 7/2006 |
| WO | WO2008024705 | 2/2008 |
| WO | WO2014063361 | 5/2014 |

OTHER PUBLICATIONS

Amazon.com General Help Forum—Amazon Prime Video—security considerations http://www.amazon.com/gp/help/customer/forums?ie=UTF8&cdForum=Fx2NFGOONPZEXIP&cdPage=1&cdSort=newest&cdThread=Tx18VZVGGU0Y32E Latest reply Jun. 17, 2013.*

(Continued)

*Primary Examiner* — Kambiz Zand
*Assistant Examiner* — Benjamin Kaplan
(74) *Attorney, Agent, or Firm* — Davis Wright Tremaine LLP

(57) ABSTRACT

Source information for requests submitted to a system are classified to enable differential handling of requests over a session whose source information changes over the session. For source information (e.g., an IP address) classified as fixed, stronger authentication may be required to fulfill requests when the source information changes during the session. Similarly, for source information classified as dynamic, source information may be allowed to change without requiring the stronger authentication.

22 Claims, 14 Drawing Sheets

(56) References Cited

U.S. PATENT DOCUMENTS

| | | |
|---|---|---|
| 7,320,076 B2 | 1/2008 | Caronni |
| 7,512,965 B1 | 3/2009 | Amdur et al. |
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van der Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0088260 A1 | 5/2004 | Foster et al. |
| 2004/0103096 A1 | 5/2004 | Larsen |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Waleczak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0296497 A1 | 12/2011 | Becker |
| 2011/0311055 A1 | 12/2011 | Parann-Nissany |
| 2011/0320606 A1 | 12/2011 | Madduri et al. |

(56) References Cited

U.S. PATENT DOCUMENTS

| | | | |
|---|---|---|---|
| 2012/0017095 | A1 | 1/2012 | Blenkhorn et al. |
| 2012/0020474 | A1 | 1/2012 | Kudoh et al. |
| 2012/0023334 | A1 | 1/2012 | Brickell et al. |
| 2012/0036551 | A1 | 2/2012 | Le Saint et al. |
| 2012/0054625 | A1 | 3/2012 | Pugh et al. |
| 2012/0060035 | A1 | 3/2012 | Kalmady et al. |
| 2012/0106735 | A1 | 5/2012 | Fukuda |
| 2012/0110636 | A1 | 5/2012 | Van Biljon et al. |
| 2012/0144034 | A1 | 6/2012 | McCarty |
| 2012/0159577 | A1 | 6/2012 | Belinkiy et al. |
| 2012/0233216 | A1 | 9/2012 | Lim |
| 2012/0243687 | A1 | 9/2012 | Li |
| 2012/0245978 | A1 | 9/2012 | Jain |
| 2012/0265690 | A1 | 10/2012 | Bishop et al. |
| 2012/0317414 | A1 | 12/2012 | Glover |
| 2013/0031255 | A1 | 1/2013 | Maloy et al. |
| 2013/0086662 | A1 | 4/2013 | Roth |
| 2013/0086663 | A1 | 4/2013 | Roth et al. |
| 2013/0111217 | A1 | 5/2013 | Kopasz et al. |
| 2013/0132232 | A1 | 5/2013 | Pestoni et al. |
| 2013/0145447 | A1 | 6/2013 | Maron |
| 2013/0166918 | A1 | 6/2013 | Shahbazi et al. |
| 2013/0191884 | A1 | 7/2013 | Leicher et al. |
| 2013/0198519 | A1 | 8/2013 | Marien |
| 2013/0254536 | A1 | 9/2013 | Glover |
| 2013/0282461 | A1 | 10/2013 | Ovick et al. |
| 2013/0318630 | A1 | 11/2013 | Lam |
| 2014/0013409 | A1 | 1/2014 | Halageri |
| 2014/0082715 | A1 | 3/2014 | Grajek et al. |
| 2014/0122866 | A1 | 5/2014 | Haeger et al. |
| 2014/0181925 | A1 | 6/2014 | Smith |
| 2014/0208408 | A1* | 7/2014 | Bilgen et al. .............. 726/8 |
| 2014/0281477 | A1 | 9/2014 | Nayshtut et al. |
| 2014/0281487 | A1 | 9/2014 | Klausen et al. |
| 2015/0082039 | A1 | 3/2015 | Stalzer et al. |
| 2015/0089614 | A1* | 3/2015 | Mathew et al. .............. 726/7 |

OTHER PUBLICATIONS

Wikipedia, "Physical unclonable function," retrieved Aug. 22, 2013, from http://en.wikipedia.org/wiki/Physical_unclonable_function, 8 pages.

Berners-Lee et al., "Uniform Resource Identifier (URI): Generic Syntax," Network Working Group Request for Comments: 3986, The Internet Society 2005 retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion mailed Dec. 30, 2014 in International Patent Application No. PCT/US2014/057043, filed Sep. 23, 2014.

International Search Report and Written Opinion mailed Dec. 30, 2014 in International Patent Application No. PCT/US2014/057051, filed Sep. 23, 2014.

International Search Report and Written Opinion mailed Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 System Administrator's Guide [online]," May 2012 retrieved Jun. 27, 2012, from http://web.mit.edu/kerberos/krb5-1.10/krb5-1.10.2/doc/krb5-admin.html, 57 pages.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 UNIX User's Guide," dated May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US/058083 on Dec. 27, 2012.

Roth et al.,"Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from internet Jun. 27, 2012, https://tools.ietf.org/html/rfc1994, 13 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

* cited by examiner

| IP Address Set ID | Classification Score | Classification |
|---|---|---|
| IP Address Set 1 | 0.3 | FIXED |
| IP Address Set 2 | 0.1 | FIXED |
| IP Address Set 3 | 0.4 | VARIABLE |
| IP Address Set 4 | 0.1 | FIXED |
| IP Address Set 5 | 0.5 | VARIABLE |
| IP Address Set 6 | 0.9 | VARIABLE |
| IP Address Set 7 | 0.2 | FIXED |
| IP Address Set 8 | 0.6 | VARIABLE |

| Customer | Reputation Score | Movement Reports | Agreement Score |
|---|---|---|---|
| Customer 1 | $R_1$ | $M_1$ | $A_1$ |
| Customer 2 | $R_2$ | $M_2$ | $A_2$ |
| ⋮ | ⋮ | ⋮ | ⋮ |

ADAPTIVE CLIENT-AWARE SESSION SECURITY AS A SERVICE

CROSS REFERENCE TO RELATED APPLICATIONS

This application incorporates by reference for all purposes the full disclosure of co-pending U.S. patent application Ser. No. 14/153,847, filed concurrently herewith, entitled "ADAPTIVE CLIENT-AWARE SESSION SECURITY".

BACKGROUND

The security of resources is of importance in many contexts. Unauthorized access to various types of data, for example, can have numerous adverse consequences, such as unrealized revenue, data loss, a loss of customer goodwill, damage to reputation, and/or even civil or criminal penalties. As a result, numerous techniques have been employed to prevent unauthorized access to data. Users of a website, for example, are often required to provide credentials, such as a username and password, before certain types of data are provided. At the same time, various techniques have been developed to improve usability, such as by avoiding the need to have a user input credentials for each request that is made. For example, the use of sessions enables users to log in to a system once, thereby obtaining the ability to access certain data over multiple requests.

Over the course of a session, a user may, through an appropriate computing device, submit multiple requests to a system. In many instances, from the point of view of the system receiving the requests, requests associated with the same session may indicate different origins (e.g., Internet Protocol (IP) addresses) of the requests. Various networking equipment may intercept requests from a user device and, for various purposes, cause the requests to identify a different source address for the requests, where the identified source may change over the course of a session. In addition, common activity can cause the source of requests to change over the course of a session. For example, a user may take a portable device between home and work, thereby causing a new IP address to be assigned to the device each time the device is moved from one location to another. As a result of the common occurrence of IP address changes during a session, it can be difficult to distinguish between legitimate requests that identify a new IP address and unauthorized behavior, such as unauthorized access to and use of cookies to impersonate a user.

BRIEF DESCRIPTION OF THE DRAWINGS

Various embodiments in accordance with the present disclosure will be described with reference to the drawings, in which:

FIG. 9 shows an illustrative example of a representation of a database table which may be used in accordance with at least one embodiment;

DETAILED DESCRIPTION

Figure 1:
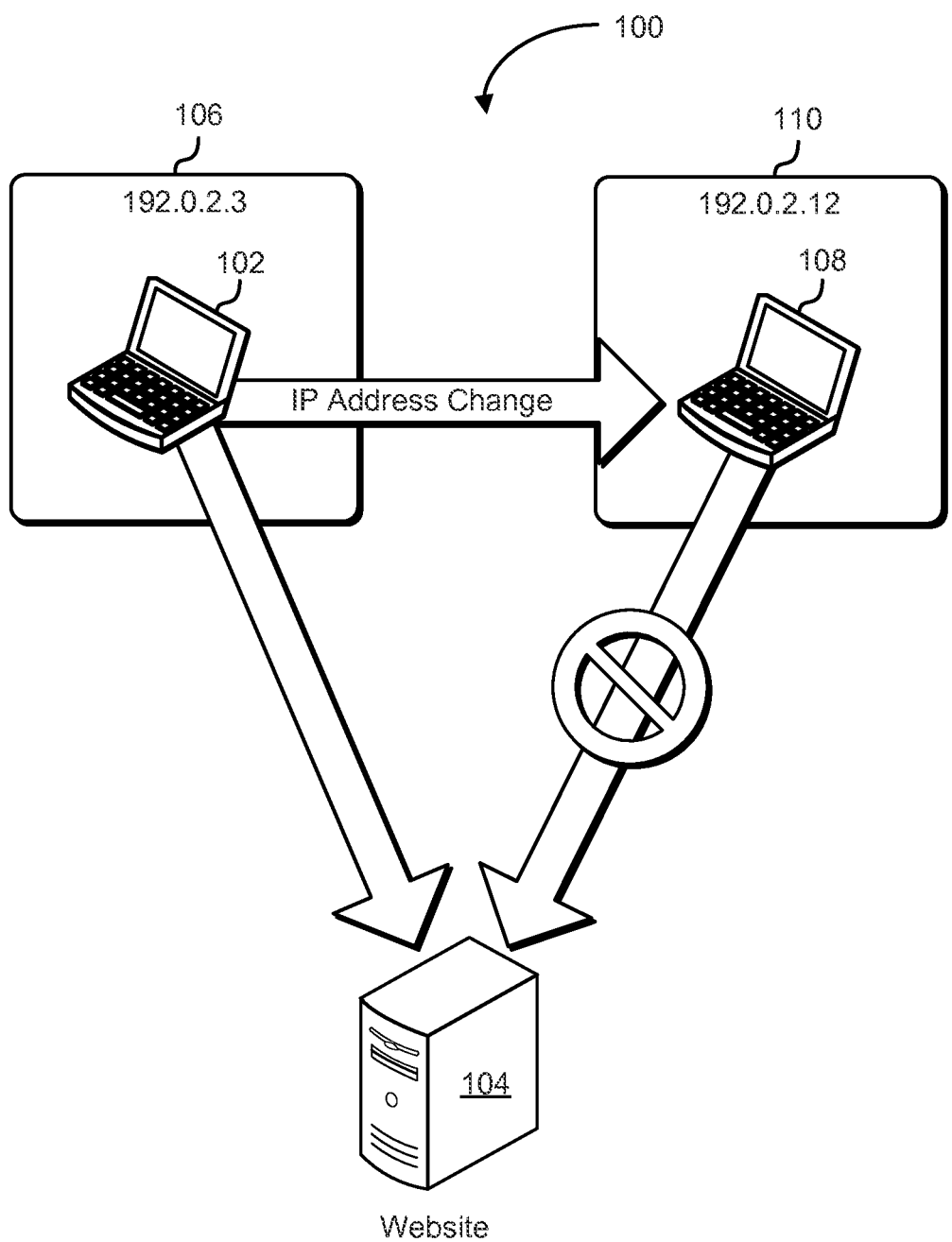
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include using changes in requests to determine how to process the requests. In some examples, sessions are used to track requests from clients' computer systems. A client computer system may utilize information, such as a cookie, that encodes information associated with a session, such as a session identifier to identify the session for which a request is submitted. Requests may be received with source information identifying a source of the requests, such as a source Internet Protocol (IP) address for each request. In some instances, the source information may change over the course of a session and the reason for the change can vary. Some causes of a change in source information during a session may be innocuous. A mobile client device may, for instance, be moved from one network to another, such as from a home network to a corporate network at a place of employment. In other examples, networking equipment may change the source information en route as part of normal operations. In some instances, the reasons for a change in source information are due to unauthorized behavior, such as unauthorized access to the information about the session being used to submit unauthorized requests.

The techniques described and suggested herein include classifying source information and using classifications of source information to determine how to process requests when the source information changes. In an example, classifications of source information are used to determine whether a change in source over a session is unexpected, thereby enabling a system to operate differently than it would otherwise operate when unexpected changes in source occur. In the example of source IP addresses, IP addresses are classified as being fixed or variable, where a fixed classification for an IP address corresponds to a lower likelihood (relative to a variable classification for another IP address) that, once a request from the IP address is received on a session, a subsequent request on the session will be received from another IP address. In some embodiments, when requests over a session change from an IP address classified as fixed to another IP address, such a change may be characterized as unexpected. Information about IP addresses may be tracked over the course of sessions and used to update and make more accurate the classifications.

In some embodiments, scoring is used to indicate a confidence of a classification. For example, if a request on a session is received from a first IP address and a subsequent request on the session is received from a second IP address, a score for at least the first IP address may be updated to indicate that it is less likely to be classified as fixed (if classified as fixed) or that it is more likely to be variable (if already classified as variable). In this manner, the confidence that a classification for an IP address is classified correctly may be used in determining how to process requests when subsequent requests on a session are received from another IP address.

Various techniques may be used to implement classifications of source information. For example, in some embodiments, each IP address of a plurality of IP addresses receives its own corresponding classification that is maintained in a database or other data store. In some examples, IP addresses are grouped by block, subnet, by recorded behavior (e.g., groups of IP address to/from requests are received over common sessions) and/or in other ways. Each group may receive a corresponding classification. Reclassification of one or more IP addresses in a group may cause the group to be split, where a subset of the group receives a new classification and its relative complement continues to have its previous classification. Other techniques and greater detail of the techniques mentioned above are discussed below.

The techniques described and suggested herein are also usable to provide services to other service providers (service provider customers) to enable the service provider customers to determine how to process requests when information indicating a source of the requests changes over sessions. A service provider customer of a service provider may, for example, operate a website where access to at least a portion of the website requires successful completion of a strong authentication process (e.g., presentation of a valid username and password). In some examples, the service provider maintains a database having stored therein information about sets of IP addresses (which may be individual IP addresses), such as described above and in more detail below. The service provider is configured to receive requests over a network regarding IP address movement detected by service provider customers (e.g., when a source IP address associated with a session changes during the session). The service provider may provide responses regarding whether the detected movements are unexpected. For example, the responses may indicate whether intra-session movement of an IP address is unexpected according to calculations of the service provider. As another example the responses may contain recommendations regarding whether the service provider customers should require performance of a strong authentication process (e.g., require presentation of a username and password and/or other credentials) before providing access that would have been provided had intra-session IP address movement been detected.

To utilize such services, in an embodiment, a service provider customer services requests received by the service provider customer. The requests may be, for example, requests to access web pages of a website operated by the service provider customer. The service provider customer may be configured to detect when a source IP address associated with a session changes during the session, such as when a request made as part of a session indicates a particular source IP address and then when another request made as part of the session indicates another source IP address. When the change in source IP address is detected, the service provider customer may submit a request to the service provider where the request specifies the previous source IP address and the current source IP address. The request to the service provider may be made prior to fulfillment of the request for which the source IP address changed or the service provider customer may fulfill the request for which the source IP address changed so that the service provider customer can later utilize a response from the service provider for determining how to process a future request. Upon receipt of the request from the service provider customer, the service provider may consult a database to determine whether the change from the previous source IP address to the current source IP address is unexpected and, based at least in part on the determination, provide a response to the request, such as noted above. For responses indicating unexpected changes in source IP address, the service provider customer may report back to the service provider whether performance of a strong authentication process was successful to enable the service provider to update its database.

Various techniques may be utilized to prevent customers of the service provider from adversely affecting other customers of the service provider by, either inadvertently or maliciously, providing false reporting information to the service provider (e.g., by submitting requests indicating fake changes in source IP address and falsely reporting successful performance of a strong authentication process.) In some embodiments, IP addresses are classified differently for different customers of the service provider. Data received by the service provider are processed so that information reported by a customer of the service provider has a greater effect on information used for the customer than for other customers. In this manner, if a customer provides incorrect data, the customer is primarily affecting the accuracy of the service as applied to that specific customer. For example, in some examples, an IP address may have a global classification and one or more customer-specific classifications. Information reported to the service provider about an IP address may disproportionately affect the customer-specific classification of the IP address corresponding to the customer relative to a global classification and/or one or more customer-specific classifications for other customers. As a result, customers of the service provider are prevented from providing false data to cause changes in source IP addresses from being determined by the service provider as being not unexpected when real data would cause the service provider to determine that the same changes are unexpected.

To improve the accuracy of results provided by the service provider, other techniques may be used. For example, as noted above, a database may contain global information about an IP address and customer-specific information about the IP address. Analysis by the service provider may allow information by some customers to affect the global information differently than for other customers. For example, service provider customers may have reputation scores that are used to determine the effect of information reported by the customers. A reputation score may indicate a level of trust in information provided by a corresponding customer and, consequently, may be used to determine how information reported by the customer affects corresponding global information. The reputation score may be determined in various ways. For instance, an algorithm for computing a reputation score may be configured such that, when a customer reports information about an IP address, that customer's reputation score increases when that information is confirmed by other customers (e.g., other customers that reported the same findings in connection with the same IP address (or set of IP addresses)). Reputation scores may be static for some customers. Some customers may, for example, due to size, reputation and the like may be trusted and, as a result, information provided by such customers may be allowed to affect the global information more than information provided by other customers. Other variations are discussed in more detail below.

FIG. 1 shows an illustrative example of an environment 100 in which various embodiments may be practiced. In this example, a client device 102 executes an application, such as a browser application, that submits requests to a system implementing website 104 which, while illustrated in the figure as a single server, may comprise multiple computing devices (e.g., web servers, application servers, databases and/or other devices) that are collectively configured to provide the website. Further, while a website 104 is used for the purpose of illustration, the techniques described and suggested herein are applicable to other contexts where a client device 102 may submit requests to a system to cause the system to perform one or more operations, such as provide access to a resource that is not necessarily provided in the form of a website. Techniques described and suggested herein, for example, are applicable to mobile applications on mobile devices that communicate with backend systems supporting the applications, electronic mail applications that communicate with one or more electronic mail servers and other contexts.

As illustrated in FIG. 1, the client device 102 may submit requests to the website 104 (i.e., to one or more servers used to implement the website 104. When received from the website 104, one or more requests may identify a first source Internet Protocol (IP) address 106. The source IP address 106 may be identified in the request as the source for various reasons. For example, the source IP address 106 may be the actual IP address assigned to the client device 102. In other examples, the client device 102 may be assigned a particular IP address different from the source IP address 106, but another device in a network shared with the client device 102 (such as a proxy device, firewall device, network address translation (NAT) device) may cause requests from the client device to identify a source IP address as the source IP address 106. Generally, various mechanisms utilized to implement a computer network may cause requests from the client device 102 to identify a source IP address different than that which is assigned to the client device 102. Further, it should be noted that FIG. 1 shows example IP addresses and that the actual source IP addresses of requests may vary. For example, source IP addresses may be from public IP address space.

As illustrated in the figure, the source IP address identified in requests received by the website 104 in connection with a session initiated for the client device 102 may change. The change may be caused by various events. For example, the client device 102 may be a portable computing device transferred from one network to another as a result of physical movement (e.g., by an employee bringing home a notebook computer used at his/her office, causing the notebook computer to cease communicating on a corporate network and start communicating on a home network). As another example, a device different from the client device 102 (e.g., a proxy device, firewall device or NAT device) may cause a source IP address from requests from the client device 102 to change en route to the website 104. As yet another example, a security breach may result in an unauthorized computing device submitting requests on a session initiated for the client device 102. For instance, a security breach may result in an unauthorized computer system obtaining a cookie stored on the client device 102 and attempting to use the cookie to submit requests to the website 104 in a manner impersonating the client device 102.

Accordingly, FIG. 1 illustrates a client device 108 submitting requests to the website 104 where the requests have an identified source IP address 110 that is different from the source IP address 106. The client device 108 may be the same as the client device or, in the example of an authorized client device 108, the client device 108 may be different from the client device 102. As illustrated, requests on the same session that identify different source IP addresses may be treated differently by the website 104. In some instances, for example, a change in a source IP address for requests submitted on a session may cause requests to be denied, or at least processed differently than they would had the requests identified the same source IP address. As discussed in more detail below, how a change in source IP address is treated by the website 104 may depend on a classification of a source IP address for which a session is initiated. Further, the classification may be adaptive so that better performance and higher security is achieved over time.

Figure 2:
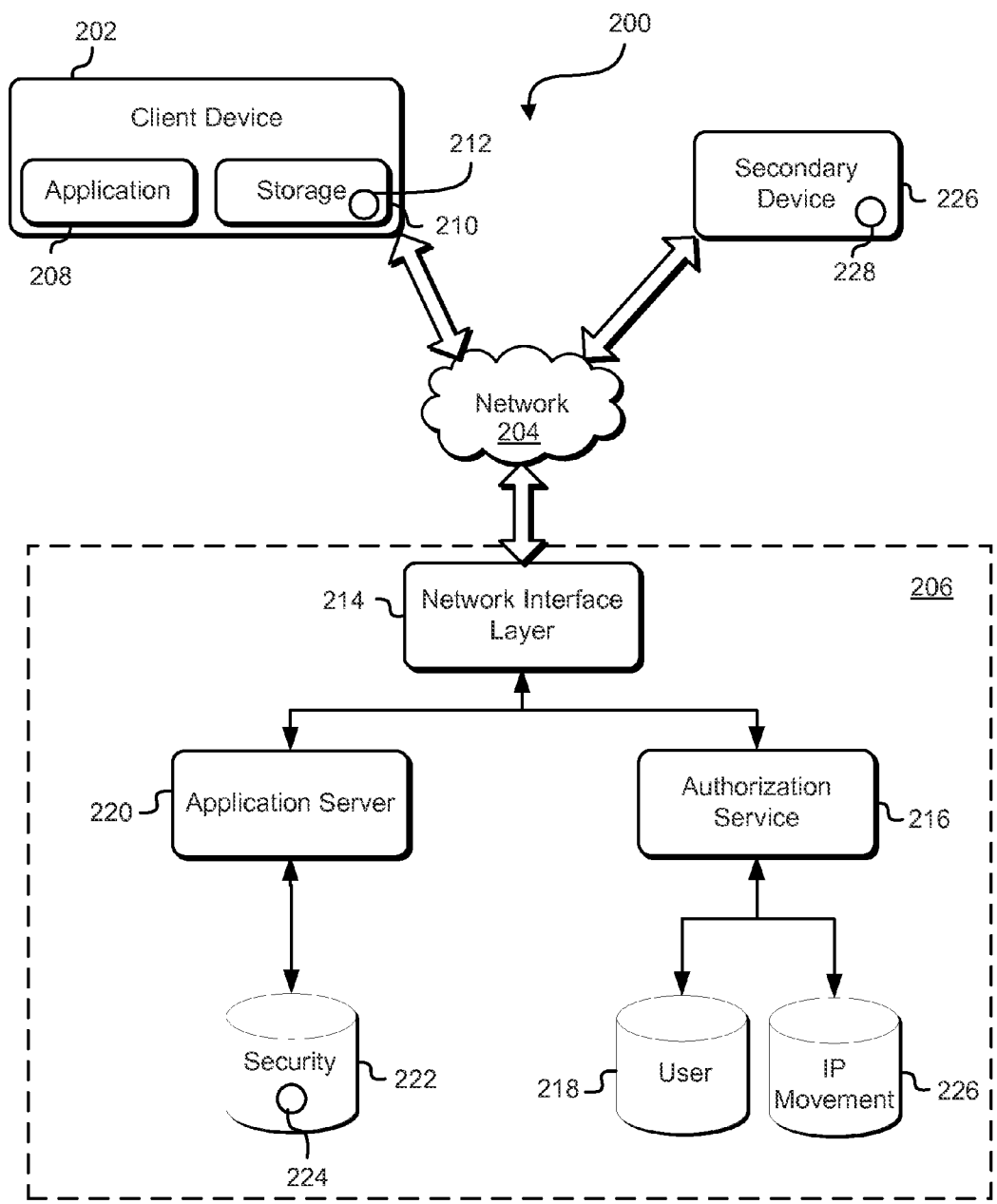
FIG. 2 shows an illustrative example of an environment, which may incorporate the environment of FIG. 1, in accordance with at least one embodiment.

FIG. 2 illustrates an example environment 200 in which embodiments can be implemented. In this example, a client device 202 executes an application 208 that is able to send and receive requests across at least one network 204 (i.e., the client device 202 is able to send and receive requests in accordance with the instructions comprising the application 208). The client device can be any appropriate computing device capable of receiving, determining, and/or processing input, as may include a tablet computer, a smart phone, an electronic book reader, a desktop computer, a notebook computer, a personal data assistant, a smartphone, a video gaming console, a television set top box, or a portable media player, among others. In at least one embodiment, the application 208 is a Web browser operable to submit requests (e.g., Hypertext Transfer Protocol (HTTP) requests) to a destination across one or more networks as may involve networks such as wired or wireless data networks, cellular networks, the Internet, satellite networks and the like. In the example illustrated in FIG. 2, the request can be directed to another entity, such as a resource provider 206 (which may be a computing resource service provider), content delivery system, or other such system configured to receive and process the request, generate and return an appropriate response. In at least some embodiments, the resource provider is a provider of shared resources in a multi-tenant computing resource service provider environment, such as a "cloud" provider. The request might be directed to a Web service provided by the provider 206, for example, where the request is received to one of a set of application programming interfaces (APIs) or other such interfaces of a network interface layer 214, which may comprise one or more computing devices configured to provide a network interface configured to receive requests, transmit responses to the requests and, in some embodiments, perform at least some processing of the requests. In some embodiments, as illustrated in FIG. 2, the network interface layer 214 can cause information for the request to be directed to an appropriate application server 220 or other such component that includes logic and/or instructions for processing the request, which may include processing information provided in the request.

For many types of requests (e.g., calls or other such transmissions) over a network 204, operations may be performed to authenticate a source of the request and/or protect the information in the request from being available to an unintended third party. In some embodiments, a client device 202 submitting a request to the provider environment 206 must first be authenticated to at least one component of the provider environment. In this example, the client device provides at least one security credential, such as a username, account number, password, biometric information or other such information, that is received to the network interface layer 214 and directed to an authentication service 216 or other such component, which can be part of, or separate from, the provider environment. The authorization service can compare information based at least in part on the received credential(s) (e.g., one or more hash calculations of the received credential(s) or the credential(s) itself/themselves) against information stored in a user data store 218 or other such location, and can determine, based at least in part on the comparison, whether to authenticate the client device and/or a user of the client device. Approaches for conventional authentication of a user or client device based upon one or more credentials are known in the art and as such will not be discussed herein in detail, although the scope of the present disclosure is not limited to conventional authentication techniques. In some embodiments, the authentication might be a multi-factor authentication (MFA) that requires multiple matching credentials for the client device.

In this example, successful authentication causes information for the request (or information derived therefrom and/or associated therewith) to be routed to the appropriate application server 220 or other such component to process information for the request. In at least some embodiments, this requires initializing a session and generating a session identifier to be provided to the client device. In some embodiments, the application server 220 provides the session identifier with other information in the form of a cookie or other secure token. A copy of the session identifier and other cookie information 224 can be stored locally, such as in a security data store 222 or other such location. A copy 212 of the cookie can also be sent across the network to be stored on the client device 202, whether in local storage 212, memory, memory used by the browser application or another appropriate location. The application 208 may be configured such that, when the client device submits a subsequent request on that session, the request is submitted with the cookie such that the request is received to the application server 220 (or another, associated application server of the environment 206). The application server (or another appropriate component) can ensure that a copy of the cookie was included with the request, and can compare the information in the received copy of the cookie with the cookie information 224 stored locally. If the information, such as the session identifier and a key value, match the information stored locally, the request can be processed. If the cookie was not provided, or the information does not match, the client device can be required to perform another authentication with the authorization service 216 or another such entity or component before a request is processed successfully. In at least some embodiments, logged-in or otherwise authenticated entities may have been provided by an external federation system or other such source.

In an approach such as that discussed above, authorization events can be classified into what will be referred to herein as "strong" authentication events and "weak" authentication events. A strong authentication event can refer to a situation where a client device has successfully participated in a corresponding authentication process ("strong authentication process"), such as by providing at least one credential that is validated by a component such as a server, which then creates a session (i.e., on the server). The server provides a credential, such as a cookie for the session, to the client device. The client device can present a copy of the cookie with subsequent requests on the session to obtain access to one or more resources for the session, at least until a next strong authentication event is needed, requested, etc. In at least some embodiments, the server generates and/or assigns an identifier for the session that is included in the cookie. The cookie can also include a key and an issuance time or other such time stamp or timing information.

Weak authentication events can refer to situations where a client participates in a corresponding authentication process ("weak authentication process") where a request or other communication is received with a copy of a credential, such as a copy of a cookie on a session, where that credential is used to authenticate the request. In at least some embodiments, a copy of the cookie returned in response to a weak authentication event can include timing information for the last weak authentication event that happened, as well as an operation count corresponding to that last weak authentication event. Other information can be included, such as biometric information, among other types of information. The operation count can be set to zero (or another appropriate value) when the session is created in response to a strong authentication event, and the operation event incremented each time a subsequent weak authentication event occurs whereby a request is authenticated and processing performed. An example of a cookie format includes the current time stamp signed under the session key, along with the identifier for the session. When the server (or a related server) receives such a cookie, the server can look up a session corresponding to the identifier and can validate information in the cookie, such as a timestamp matching a timestamp issued by the server for this session. When the presented cookie is validated, such that weak authentication occurs, the cookie returned by the server can be encoded to include updated information, such as a new timestamp, incremented operation count, and the like.

Various other approaches to including and/or encoding information in a cookie or session token can be utilized as well within the scope of the various embodiments. In addition, while specific examples of strong and weak authentication processes are used for the purpose of illustration, other types of authentication processes may be used for strong and weak authentication processes. Further, in some embodiments, there are more than two different types of authentication processes, each having corresponding requirements for successful authentication. The authentication processes, as noted, may be categorized by security levels so that, as discussed in more detail below, different authentication processes may be required at different times. For instance, as discussed in more detail herein, one type of authentication process (if any) may be suitable until an event triggers a requirement for a different authentication process. The trigger may be, for example, a change in an IP address used to submit requests on the session and/or receipt of a request of a type for which a different type of authentication process is required (such as a request for information classified as sensitive, a request to complete a commercial transition, and/or the like).

As discussed in more detail below, the type of authentication process that is required for fulfillment of a request may be dependent on various factors and the results of various operations. In some embodiments, when the source IP address of a request changes from one request on a session to the next, the way in which a source IP address is classified may affect how a request is processed and, in particular, what type of authentication is required for fulfillment of a request. In some embodiments, classifications and other information about IP addresses are maintained in a database which is illustrated in FIG. 2 as an IP movement database 226. The IP movement database, in an embodiment, maintains information about IP addresses in association with the IP addresses. The maintained information may include, for instance, information indicative of how the IP address is classified (e.g., fixed or variable) and/or a confidence score for a classification. As part of its operations, the authorization service 216 may monitor changes to source IP addresses over sessions (although such may be performed by another system, such as in the network interface layer 214). When the authorization service 216 detects that a source IP address for a session has changed, the authorization service 216 may access query the IP movement database 226 to access information about the source IP address from which the change was detected. Based at least in part on the accessed information, as discussed in more detail below, the IP authorization service 216 may provide an appropriate response to the network interface layer 214 to enable the network interface layer 214 to respond to a request appropriately, which may include communicating with the application server 220 to obtain a response fulfilling the request, by transmitting content requesting login credentials and/or in other ways.

Figure 3:
FIG. 3 shows an illustrative example of a representation of a database table which may be used in accordance with at least one embodiment.

FIG. 3 shows an illustrative example of a database table 300, which may be used in the IP movement database 226, described above in connection with FIG. 2. In the example database table 300 of FIG. 3, data is organized by columns and rows. In this example, each row corresponds to a set of IP addresses, identified in the first row. Sets may have different numbers of members in accordance with various embodiments. For example, in some embodiments, a database utilizing the table 300 includes a row for each IP address of a set of IP addresses, which may comprise all IP version four (IPv4) addresses or which may selectively have rows for IP addresses. In other words, each set may have one member. In some embodiments, a row may correspond to more than one IP address, such as a block of IP addresses. When data about an IP address is requested from the database (e.g., in the form of an appropriately configured database query), information in a row corresponding to a block of IP addresses of which the IP address is a member may be provided. As discussed below, rows may be divided (e.g., one row may become two rows) or combined (multiple rows being consolidated into a single row) as appropriate. It should be noted that, while IP addresses are used throughout the present disclosure for illustrative purposes, any information (e.g., netmask information) that is usable to identify a source may also be used in addition to or instead of IP addresses.

In some embodiments, a row is added each time a request is received identifying a source IP address that is not in the table. The table may also be pre-populated and/or updated using information known about IP addresses (e.g., information from the American Registry for Internet Numbers (ARIN)). For example, IP address registration information may be used to determine ownership of blocks of IP addresses and such blocks may be used to populate rows in the database table 300.

As illustrated in FIG. 3, the database table 300 includes a column for a classification score (middle column) and a column for a classification (right-hand column), which in this example contains a value of FIXED or VARIABLE, although other classifications, including classification schemes with more than two possible classifications, may be used. The classification score, in an embodiment, is calculated to be a confidence score using a heuristic configured to correlate with a likelihood that a source IP address is fixed or variable. Fixed IP addresses may be IP addresses for which source IP addresses do not change during a session. Variable IP addresses may be IP addresses for which source IP addresses do change during a session. In an example, some systems may relatively rarely reassign IP addresses and, as a result, fixed IP addresses rarely change over a single session. Other systems may relatively often cause the source IP address for requests submitted from the same client to change over a session and, as a result, variable IP addresses may be IP addresses determined to be in such systems.

In FIG. 3's illustrative example, classification scores range between zero and one, where classification scores of zero correspond to IP addresses determined definitely to be fixed and where scores of one correspond to IP addresses determined definitely to be variable. It should be noted that determinations of whether an IP address is fixed or variable are not necessarily correct determinations, but may be the result of data strongly but incorrectly indicating a particular classification or may be the result of a guess (e.g., default value used to populate the table 300 with initial values).

In this example, scores between zero and one correspond to scores for which a definite determination has not been made. The scores may be calculated using a heuristic such that, generally, IP addresses more likely to be fixed have a relatively lower score and IP addresses more likely to be variable have a relatively larger score. For example, the heuristic may be configured such that, for a first IP address used to submit requests on a session, if requests from the first IP address change to have a different source IP address, a score for the first IP address may increase. Likewise, if multiple requests are received with the same source IP address, the score for the source IP address may decrease. As one illustrative example, for an IP address, the heuristic may be or otherwise based at least in part on (1) the number sessions for which multiple requests have been received from the IP address and (2) the number of sessions for which a request has been received from the IP address and at least one other IP address. If the numbers in the previous sentence are M and N, respectively, the heuristic may be N divided by M. In this manner, if the IP address remains the same for every session, the heuristic would be zero, if the IP address always changes during a session, the heuristic would be one, and if the IP address sometimes changes during a session, the heuristic would be between zero and one.

As another illustrative example, the previous example may be modified to take into account the number of requests received from the IP address. The heuristic may be, for instance, based at least in part on M and N (from the previous example) and K, where K is the number of requests received from the IP address. For instance, the heuristic may be the previous example's heuristic divided by K. As yet another example, the heuristic may be based at least in part on N and K (without N), such as by being or otherwise based at least in part on N divided by K. In these examples, if sessions associated with the IP address (e.g., because of a requests on the session received from the IP address) often change IP address, the heuristic will be closer to one and if sessions associated with the IP address relatively infrequently change IP address, the heuristic will be closer to zero. Of course, the heuristics described herein are illustrative in nature and the scope of the present disclosure is not limited to those heuristics explicitly described.

It should be noted that the particular arrangement of data in FIG. 3 is also illustrative in nature, and other ways of organizing data may be used, in addition to ways of organizing data that does not necessarily utilize a relational table. Also, a database that stores information used in accordance with the various techniques may also store other data, such as data used for the calculation of the classification score (e.g., values for K, M, and N in the above examples), although such data may be stored separately. Further, as noted above, in some embodiments, a row may correspond to a plurality of IP addresses (e.g., a block of IP addresses). When using data in the table 300 to determine a classification for an IP address, data for an IP address may be inherited from a row corresponding to a block of which the IP addresses is a member. Similarly, when data in the table 300 is updated due to recorded activity in connection with an IP address, data for a corresponding block may be updated and/or, as discussed elsewhere herein, a row for block may be divided and the data for the resulting blocks may be updated accordingly.

Figure 4:
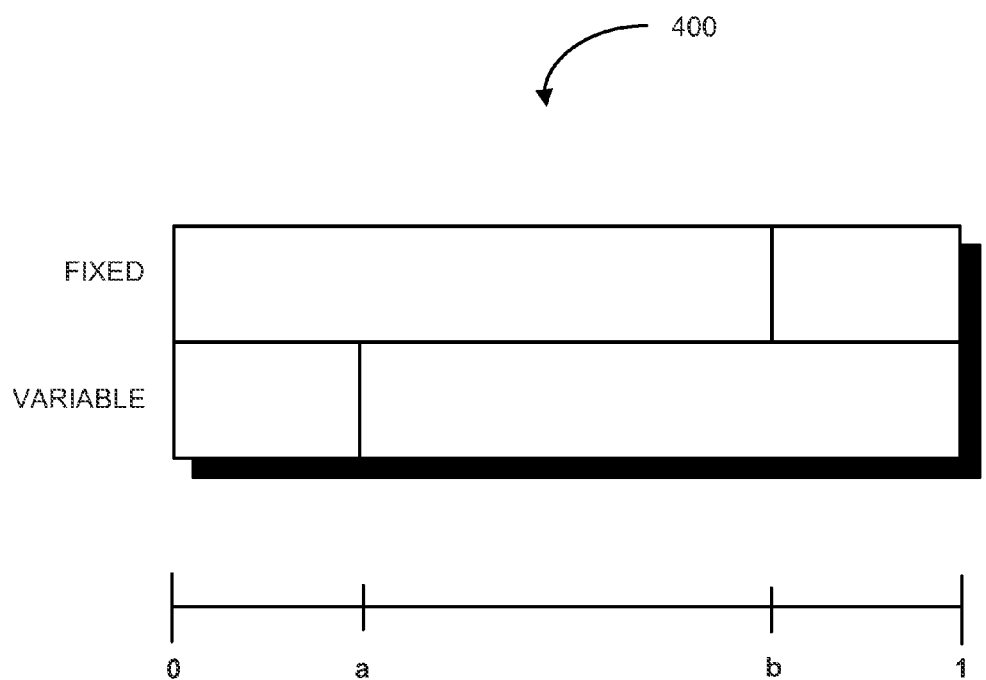
FIG. 4 shows a diagram illustrating various aspects of the present disclosure.

In some embodiments, the classification score for an IP address may be determinative of the classification of the IP address. In some embodiments, however, both a current classification of an IP address and its classification score are used to determine whether the IP address should be reclassified. Accordingly, as illustrated in FIG. 3, the table 300 also includes a column for classifications of corresponding IP address sets. FIG. 4 illustrates how both a current classification of an IP address set and a classification value can be used to determine whether to update a classification. For example, in FIG. 4 a representation 400 of ranges, between zero and one, is shown. The representation 400 includes ranges for fixed classifications (labeled as "FIXED") and ranges for variable classifications (labeled as "VARIABLE"). Also in FIG. 4, a number line with points 0<a<b<1 is shown. As an example, "a" may be 0.33 and "b" may be 0.66, although other values may be selected and the values selected are not necessarily equidistant from the closest endpoints.

For the fixed ranges (i.e., ranges of fixed IP addresses), in various embodiments, IP addresses classified as fixed remain classified as fixed as long as their classification scores remain between zero and "b". For an IP address classified as fixed to change its classification to variable, a classification score, in some embodiments, must exceed "b." For variable ranges (i.e., ranges of variable IP addresses), in various embodiments, IP addresses classified as fixed remain classified as variable as long as their classification scores remain between "a" and 1. For an IP address classified as variable to change its classification to fixed, a classification score for the IP address must fall below "a." In this manner, classification values are allowed to fluctuate a large range before a classification, thereby preventing erratic behavior if a classification value fluctuates below and above a certain value. Further, as illustrated, IP addresses classified as fixed may have classification values that are the same as or even greater than IP addresses classified as variable.

The values for "a" and "b" can be selected in various ways. For example, "a" and "b" may be selected and statically maintained. In some embodiments, values for "a" and "b" are configurable in ways that vary. In some examples, a system that implements various techniques described herein configures "a" and "b" on a per-account basis. Account holders, which may be users that submit the requests for other entities (such as customers of a computing resource service provider that utilize computing resource services to enable users to submit requests), may select security settings that correspond to different values of "a" and "b." An account holder may, for instance, select a high security setting where "b" is relatively closer to one than for lower security settings. In this manner, classifications of IP addresses would more often be and remain fixed, thereby requiring reauthentication more often as a result in changes to source IP address over a session. High security settings may also have "a" further from zero, thereby allowing variable IP addresses to be classified as fixed more easily. Similarly, account holders that select lower security settings where "b" is further from 1, thereby allowing IP addresses to be classified as variable more easily, thereby preventing reauthentication in many instances. Also, lower security settings may correspond to "a" being closer to zero, thereby allowing IP addresses to keep a variable classification for longer before a reclassification is required. There may be multiple different security settings to choose from, each with different values for "a" and "b" and, in some instances, account holders are able to select "a" and "b" directly.

Figure 5:
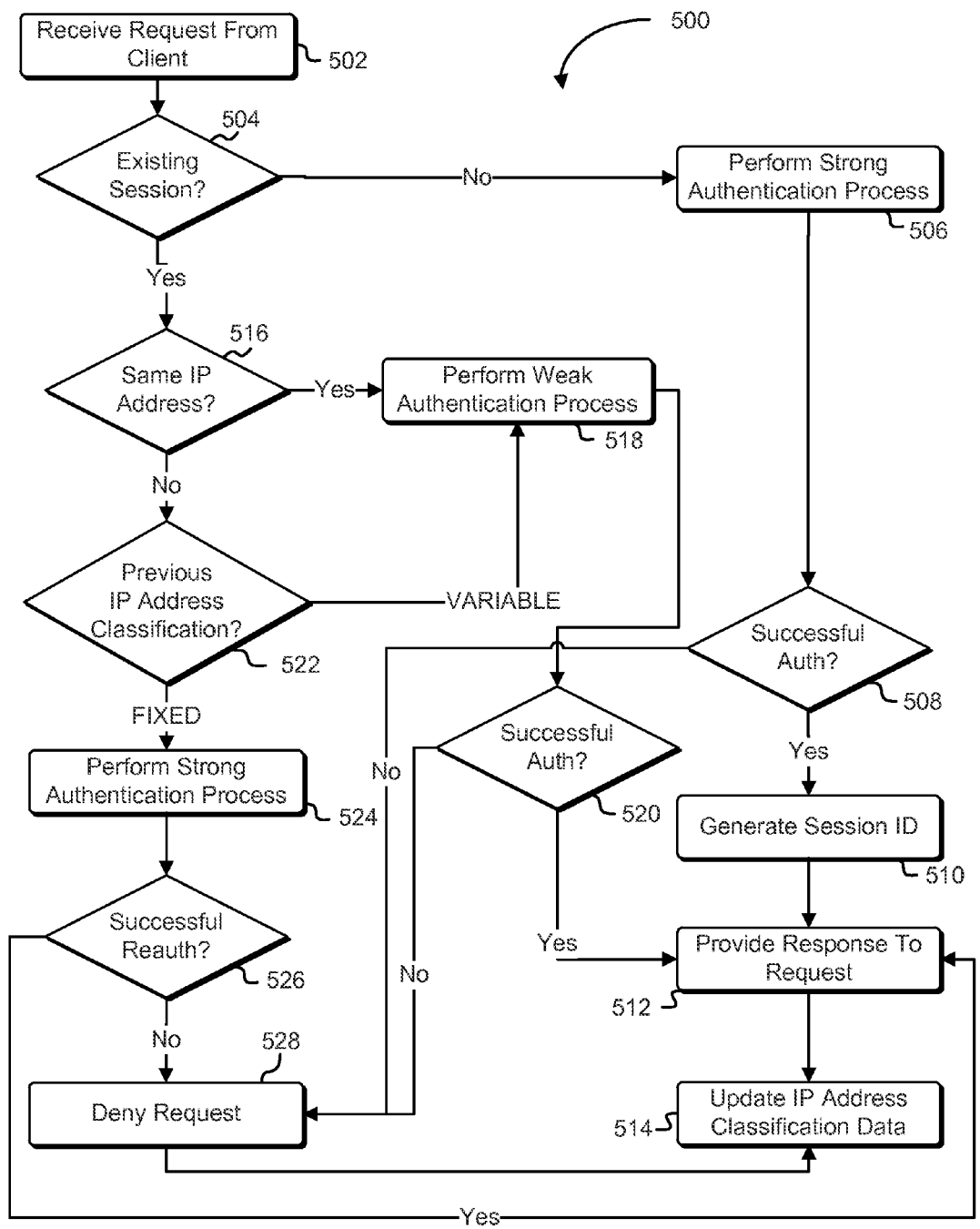
FIG. 5 shows an illustrative example of a process for processing requests in accordance with at least one embodiment.

FIG. 5 shows an illustrative example of a process 500 for processing a request in accordance with various embodiments. The process 500 may be performed by any suitable system, such as by the authorization service 216, described above, or a system comprising the authorization service 216, application server 220 and the network interface layer 214 described above. In an embodiment, the process 500 includes receiving 502 a request. Referring to FIG. 2, for instance, the authorization service 216 may receive the request from the network interface layer (which also received the request) to determine whether fulfillment of the request is authorized. The request may be configured in accordance with an appropriate protocol (e.g., HTTP) so as to be processable by the system that receives it.

Upon receipt 502 of the request, the process 500 may include determining 504 whether the request was submitted on an existing session. Determining 504 whether the request was submitted on an existing session may be performed, for example, by determining whether the request was submitted with a cookie having a session identifier or whether the request was submitted with other information indicative of a session and, if so, whether the session is still valid. Generally, any way by which a determination whether a request was submitted on a session may be performed.

If determined 504 that the request was submitted on an existing session, the process 500 may include performing 506 a strong authentication process. In the example of a website, performance 506 of the strong authentication process may include providing a login web page to the client that submitted to the request (i.e., directed to the source IP address of the request), receiving login information (e.g., login credentials or information based at least in part thereon), if any are received, and verifying the received login information. The scope of the present disclosure is not, however, limited to such authentication processes but includes, for instance, any authentication process sufficient and/or required for generation of a session. Upon performing 506 the strong authentication process, the process 500 may include determining 508 whether authentication is successful, such as by determining whether the received login information is valid and matches an account of a system for which the process 500 is being performed.

If determined 508 that the strong authentication process was performed successfully (e.g., valid login credentials were provided), the process 500 may include generating 510 a session identifier (session ID), which may be a random, serial or other value that identifies the session uniquely in the system performing the process 500 or is otherwise usable to identify the session. A response to the request may then be provided 512. Providing 512 the response to the request may include performing one or more operations (e.g., calculations and/or data access operations) to generate the response, generating a cookie or other information to include with the response and providing the response and cookie or other information over a network to the source IP address identified in the request.

Performance of the process 500 may also include updating 514 IP address classification data, which may be data associated with the source IP address of the received 502 request, such as may be stored in a database as described above or in another manner. Updating 514 the IP address classification data may be performed by, for example, updating a classification score, updating a classification (if applicable), updating any statistics for the IP address and/or in other ways. Further, updating 514 the IP address classification data may be performed for the source IP address or a plurality (e.g., block) of IP addresses that contain the source IP address of the request. In addition, as discussed in more detail below, updating the IP address classification may be performed for the source IP address (or a set containing the source IP address) of the request that was received 502 and/or, if applicable, for a different source IP address of an earlier request on the same session. For instance, if an update that causes a classification score for the source IP address of a previous request on the same session to be increased, the source IP address the request that was received 502 may also be updated so that its corresponding classification score increases. Further, in some instances, updating 514 the IP address classification data may include generating new database records, such as when a request is received from a source IP address that is not in a database that maintains IP address classification data.

It should be noted that, while FIG. 5 shows updating 514 the IP address classification data after providing 512 the response to the request, the update may be performed at other times, such as prior to or concurrent with generating the session ID or prior to or concurrent with providing the response to the request. Further different updates may be performed at different times during performance of the process 500. Also, updating the IP address classification data may be performed asynchronously with performance of some or all of the remainder of the operations of the process 500.

Returning to the illustrated embodiment, if determined 504 that the received 502 request was submitted on an existing session, the process 500 may include determining 516 whether the request was received from (i.e., identifies the source IP address as) the same IP address as a previous request on the same session, which may be the immediately prior received request. An application server or authorization service may, for example, maintain a database (e.g., Security database 222 described above) with information about sessions which may store, in association with a session identifier, information such as one or more IP addresses from which one or more requests were received on the session. Determining whether the request was received from the same IP address may, therefore, include accessing an appropriate database.

If determined 516 that the request was received from the same IP address, the process 500 may include performing 518 a weak authentication process. Performing the weak authentication process may include, for example, analyzing the request and information provided therewith to determine if the information/request is valid, such as described above. The weak authentication process may be any authentication process different from a strong authentication process. In some embodiments, a weak authentication process is an authentication process performed to authenticate a request without requiring additional information (e.g., login credentials) from a client device. A weak authentication process may include, for example, verifying a session identifier, verifying a digital signature generated using a session key for the session and/or other operations. Upon performance 518 of the weak authentication process, the process 500 may include determining 520 whether authentication was successful, such as described above. If determined 520 that authentication was successful, the process 500 may include providing 512 a response to the request and updating 514 IP address classification data, such as described above.

If it is determined 516 that the request was received 502 from a different IP address than a previous request's source IP address, the process may include determining 522 a classification for the source IP address of the previous request. Determining the classification may be performed in various ways, such as by accessing a database, such as described above, to determine the classification. In some embodiments, data for the previous request's IP address is accessed and the change in IP address is used to determine whether to change an existing classification, e.g., by updating a classification score and determining whether the updated score corresponds to a changed classification. As noted above, in some embodiments, IP addresses may be classified as variable or fixed. Accordingly, as illustrated in FIG. 5, if determined 522 that the previous IP address is classified as variable, the process 500 may include performing a weak authentication process, such as described above and proceeding based at least in part on performance of the weak authentication process, such as described above. If, however, it is determined 522 that the previous IP address is classified as fixed, the process 500 may include performing 524 a strong authentication process, which may be the same or a different strong authentication process, such as described above. A different strong authentication process may require, for instance, additional data from the client for authentication (e.g., providing a city of birth and/or mother's maiden name in addition to username and password).

Upon performing 524 the strong authentication process, a determination may be made 526 whether reauthentication was successful. If determined 524 that performance of the strong authentication process was successful, the process 500 may include providing 512 a response to the request, such as described above and updating IP address classification data. If, however, it is determined 508, 518, 528 that authentication/reauthentication was unsuccessful, the process 500 may include denying 528 the request, which may be performed by providing a response indicating that the request is denied, one or more reasons for the requests' denial, repeat performance of the strong authentication process or another strong authentication process, and/or other operations. Denying 528 the request may, in some embodiments, include simply not performing additional operations (such as providing a response indicating the denial). Other variations are also considered as being within the scope of the present disclosure.

Figure 6:
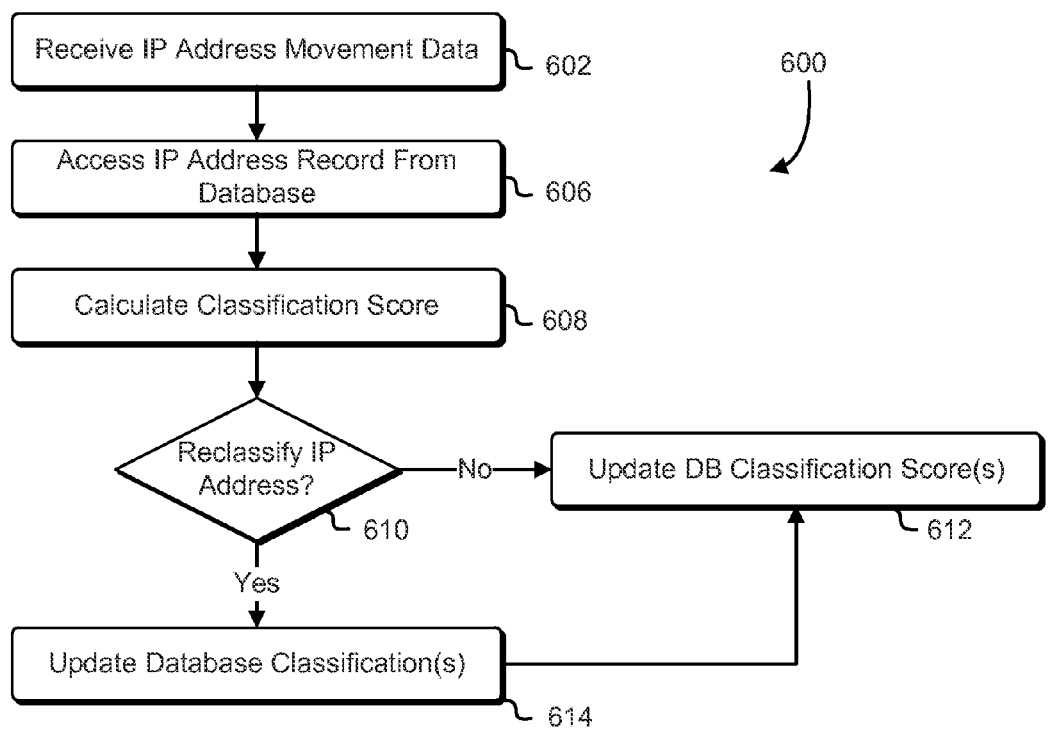
FIG. 6 shows an illustrative example of a process for updating a database in accordance with at least one embodiment.

FIG. 6 shows an illustrative example of a process 600 for updating IP address classification data, such as during performance of the process 500 discussed above in connection with FIG. 5. The process 600 may be performed by any system that manages IP address classification data, such as by an authorization service 216 or another system with access to the IP Movement database 226. In an embodiment, the process 600 may include receiving IP address movement data, which may be any data that indicates whether and/or how an IP address has changed during a session. The movement data may also include data about a recent (e.g., pending) request that was received, such as a source IP address for the request, a source IP address (or addresses) for one or more previous requests received on the same session, statistics about the IP address recorded over time (perhaps over multiple sessions) and the like. In an embodiment, the process includes accessing 606 data stored in a database, such as described above in connection with FIG. 3. For example, if a request is received with a new source IP address, a query may be submitted to a database for a database record corresponding to the source IP address from which a previous request was received.

A classification score may be calculated 608 as described above and a determination may be made 610 whether to reclassify the source IP address for the previous request. Referring to FIG. 4, the determination 610 whether to reclassify the IP address may be based at least in part on the classification score and the current classification, although, in some embodiments, the classification score alone or in used in conjunction with other data is determinative of whether to reclassify. If it is determined 610 to not reclassify the IP address, the process 600 may include updating 612 the classification score in the database. If, however, it is determined 610 to reclassify the IP address, the process 600 may include updating 614 the classification in the database as well as updating 612 the classification score in the database. While updating the database classification is illustrated as a separate operation from updating the classification score, such may be performed in a single update, such as through a command to the database to update both.

Further, as noted above, a database may associate scores and classifications with corresponding sets of IP addresses. Accordingly, the process 600 may be adapted to such embodiments. For example, classification scores and classifications may be calculated and updated for blocks of IP addresses. Also, as noted, a reclassification of an IP address may include splitting a record for a single set of IP addresses into two sets. Numerous techniques may be performed to determine which records to update. For example in some embodiments, movement from one IP address to another during a session may be tracked over multiple sessions and multiple clients and used to generate a directed graph where each node represents an IP address from which a request was received and an edge from a first node to a second indicates that, during a session, a source IP address changed from the IP address represented by the first node to the IP address represented by the second node. Sets of IP addresses may be determined by locating strongly connected components in the graph (i.e., maximal strongly connected subgraphs). Data may be maintained and updated on a set-wide basis.

Further, as noted, other information may be used when determining whether to reclassify an IP address (or a set containing the IP address) and/or whether to perform reauthentication. For instance, in some embodiments, information about the IP addresses involved in a session may be used in determining whether to require reauthentication when an IP address as variable may otherwise indicate that reauthentication is unnecessary. For example, a database of geographic information that associates IP addresses with geographic locations may be utilized to determine whether certain IP address changes are unlikely. Jumps of large geographic distances, for example, may indicate a higher likelihood of an authorized request and, therefore, may indicate a need for reauthentication. As another example, in embodiments where graphs are constructed as described above, IP address jumps from a strongly connected component in a graph to an IP address outside the strongly connected component (perhaps to another strongly connected component) may indicate a need for reauthentication regardless of an IP address classification of variable. Other variations are also considered as being within the scope of the present disclosure.

In some embodiments, systems are configured to provide advance warning of an IP address change for a device submitting requests on a session. A device causing legitimate source IP address changes for requests submitted by a device may transmit a communication indicating a change in IP address. The communication may be sent to, for example, the client device and/or a system to which the client device submits requests. The system receiving the requests from the client device may receive a communication (from the client device or from another device) indicating a source IP address change for the client device. The communication may include a digital signature or other authentication information that enables a determination of the communication's authenticity. As a result of receipt of the communication, the system may process a request from the client device with a changed source IP address differently than it would process the request with the changed source IP address had it not received the communication. For example, the system may require only successful completion of a weak authentication process when it would otherwise require successful completion of a strong authentication process upon detecting a change in a source IP address during the same session.

Other variations considered as being within the scope of the present disclosure relate to methods by which information may be recorded to determine whether changes of source IP addresses over a session are unexpected, thereby requiring stronger authentication. For example, machine learning techniques may be used to enable determinations of whether IP address changes are expected. Observations may be recorded where the observations include detected change from a first source (IP address or block of IP addresses) to a second source (IP address or block of IP addresses), whether strong authentication required as a result of a change was successful to train a model that can then be used as a predictor for future detections of changed IP address. Such a model may be used, for example, to determine whether a change from a first IP address to a second IP address during a session is expected and, therefore, whether to require stronger authentication, such as described above.

Figure 7:
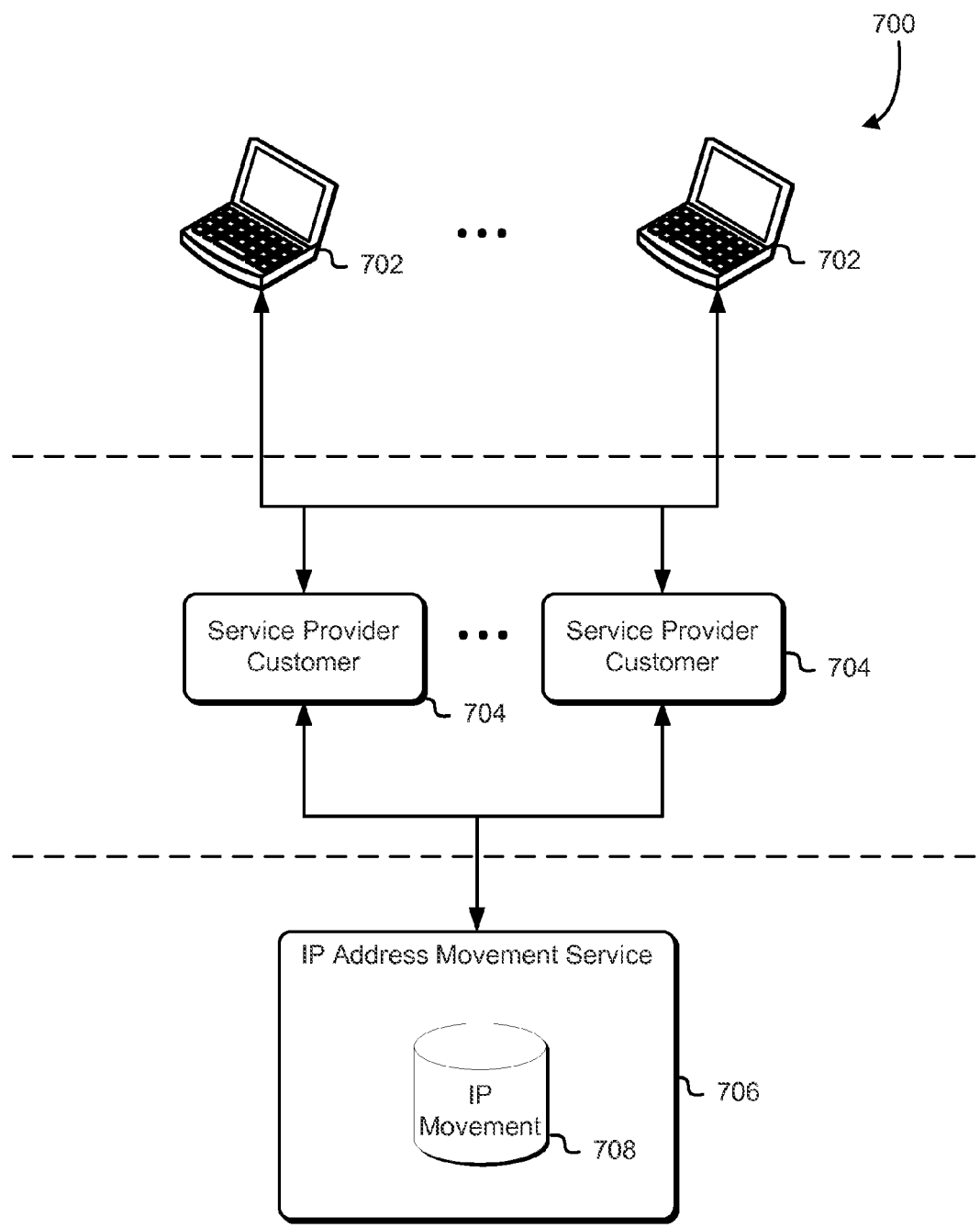
FIG. 7 shows an illustrative example of an environment in which various embodiments can be implemented.

As noted above, the various techniques described above and additional techniques described below may be used to provide services to others, such as other service providers who process requests on behalf of users. FIG. 7, accordingly, shows an illustrative example of an environment which may be used to implement various embodiments of the present disclosure. As illustrated in FIG. 7, the environment 700 includes a plurality of user devices 702. The user devices may be any suitable device configured to communicate over a network, such as devices listed below. In the example of FIG. 7, the user devices 702 communicate with various service provider customers 704 that, as illustrated, utilize services of an IP address movement service 706. The service provider customers 704 may, for example operate websites, backend systems to mobile applications and/or other systems configured to process requests from the user devices 702. The IP address movement service 706 may be a computer system (e.g., collection of computing devices collectively configured to provide information regarding intra-session movement of IP address or other request source identifiers to enable use of the provided information to be used in determining how to process requests, such as by imposing a requirement that reauthentication be performed successfully before a request is fulfilled. The IP address movement service 706 may, for example comprise one or more servers, such as described below, and may comprise an IP address movement database 708, which may store organized data maintained for sets of IP addresses, such as described above and as described below.

To utilize the IP address movement service 706, a service provider customer 704 may, during the processing of requests of the user devices 702, detect that a request on a session indicated a second source IP address when the session was previously associated with a first source IP address (e.g., because a previous request on the session identified the first source IP address). As a result of detecting the change in source IP address over a session, the service provider customer 704 may transmit a request (e.g., in the form of an API call comprising information sufficient for fulfillment by the IP address movement service and formatted in a manner the IP address movement service is configured to process) to the IP movement service. The request may, for example, specify an IP address previously associated with a session (i.e., an IP address identified as a source IP address for a previous request in the session when a subsequent request on the session identified a different source IP address). The request may include other information, such as information used to authenticate the requestor and, in some embodiments, a second source IP address (e.g., the IP address identified in the subsequent request on the session).

Upon receipt of a request from a service provider customer 704, the IP address movement service may access one or more records from the IP address movement database 708 and use the accessed records to determine whether an intra-session move from the IP address previously associated with the session is unexpected. The one or more records may correspond to the IP address previously associated with the session and, in some embodiments, may include one or more records corresponding to the second source IP address so that the determination may be based at least in part on both IP addresses. The IP address movement service may provide information about the determination to the service provider customer 704 that submitted the request. The information may be provided in various ways in accordance with various embodiments. For example, the information may indicate whether the change was unexpected. In some embodiments, the response may provide a recommendation to perform one or more actions, such as require reauthentication.

Upon receipt of the response, the service provider customer 704 may operate in accordance with the response from the IP address movement service 706. For example, the service provider customer 704 may require reauthentication to be performed before one or more additional requests on the session are fulfilled. The service provider customer 704 may also perform additional operations, such as by providing information about whether reauthentication (or another authentication process) was performed successfully to enable the IP address movement service 706 to update the IP address movement database 708, such as by recalculating one or more classification scores and/or by reclassifying the source IP address specified in the request to the IP address movement service 706. Feedback regarding the IP address(es) specified in the request may be provided by the service provider customer 704 as it is available or in other ways, such as in batch uploads.

Figure 8:
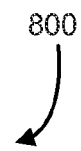
FIG. 8 shows an illustrative example of a representation of a database table which may be used in accordance with at least one embodiment.

FIG. 8 shows an illustrative example of a database table 800, which may be used in the IP movement database(s) 226, 708, described above in connection with FIGS. 2 and 7 and/or otherwise. In many aspects, the database table 800 is used to store data that is stored by the database 300 described above in connection with FIG. 3. For example, the database table 800, in this example, includes classification scores for sets of IP addresses and classifications that may have been determined based at least in part on the classification scores, such as described above. With the database table 800, however, there are classification scores for multiple entities. In this example, there is a row corresponding to a global classification score and classification and one or more rows that provide customer-specific scores and classifications. The various rows corresponding to the same IP address set may be used together or separately in various embodiments. In some embodiments, the row for the global score/classification of an IP address is used for service provider customers that have not provided feedback regarding an IP address in the set.

When a service provider customer has provided feedback regarding an IP address in the set, a row corresponding to the customer may be used to calculate and generate a response instead of or in addition to the global row for the set of IP addresses. For example, in some embodiments, the row corresponding to the service provider customer may be used to generate a response for a request from the service provider customer without using the global row for the set of IP addresses. In other embodiments, the row corresponding to the service provider customer and the row corresponding to the global values for the set of IP addresses may be used together. As an illustrative example, if the classifications in both rows agree, the agreed classification may correspond to whether a move from an IP address in the set and specified in a request from a service provider customer is unexpected and a response may be provided accordingly. If the classifications in both rows do not agree, the corresponding classification scores may be used to calculate a classification for a response that is determinative of the information in the response to be given (e.g., whether a move from an IP address specified in a request is unexpected). An average of the two classification scores may be used to determine a classification, where the average may be used to determine a classification such as described above in connection with FIG. 4. The average may be weighted, where the weight corresponding to the service provider customer may depend on one or more factors, such as a reputation score for the service provider customer, an amount of feedback provided by the service provider customer, an amount of feedback provided by the service provider customer and verified by feedback of one or more other service provider customers, a predetermined weight input corresponding to, for example, customers that are determined to be trusted and/or other factors.

Similarly, when the customers provide feedback about IP addresses in IP address sets, the manner in which the database table 800 is updated may vary in accordance with different embodiments and, in various embodiments, may vary among customers. As an example, feedback regarding an IP address in an IP address set may be used to update a row specific to the customer service provider that provided the feedback. The amount, if any, by which the feedback affects an update to the global row corresponding to the IP address (i.e., an IP address set that contains the IP address) may be determined based at least in part on various factors, such as the factors described above. In this manner, by making responses and updates to the database table 800 customer specific, customers are prevented from providing false data to adversely affect the accuracy of the data in the database table 800. Thus, an entity that poses as a service provider customer who submits fake requests specifying IP addresses and who provides false information about reauthentication after a session moves from the specified IP address, is prevented from causing an IP address movement service from providing incorrect information regarding whether an intra-session move from one IP address to another is unexpected. Thus, entities with malicious intent are prevented from causing harm to users by submitting requests on others' sessions and preventing detection by causing an IP address movement service to provide incorrect information.

As noted, information about what feedback service provider customers have provided may be used in determining how to provide responses to requests to an IP address movement service and/or how to process feedback from the service provider customers. FIG. 9, accordingly, shows an illustrative example of a database table 900 which may be used in connection with the database table 800 described above in connection with FIG. 8 or in connection with data stored in accordance with other embodiments. In the embodiment illustrated in FIG. 9, information about the quality and quantity of the information provided by service provider customers is maintained in the database table. As illustrated, each row of the database table 900 includes an entry that, when populated, includes a value for a reputation score, a number of movement reports, and an agreement score. Beginning with the number of movement reports (whose values are, in this embodiment, in the column labeled "Movement Reports in the drawing), the number of movement reports may be a number of reports for IP addresses for which a service provider customer has provided feedback (e.g., IP addresses for which the service provider customer has provided feedback after requiring reauthentication after a requests on sessions associated with the IP addresses have indicated different source IP addresses). For example, if a service provider customer has provided 100 total reports for 80 IP addresses (i.e., some IP addresses having multiple reports), the number in the database for the number of movement reports may be 100. Other values which correlate or otherwise correspond to a number of reports received (historically or over a time period) may also be used.

The agreement score for a service provider customer, in an embodiment, indicates how other service provider customers report information about IP addresses consistent with the information provided by the service provider customer. In an embodiment, the agreement score is or is otherwise based at least in part on a number of reports for an IP address that the service provider has provided feedback for and that at least a minimum number of other service provider customers (which may be one) has also provided feedback. As an example, the agreement score for a service provider customer may be:

$$\frac{a+1}{a+d+1}$$

where the variable a represents the number of times feedback by the service provider customer agrees with feedback from another service provider customer and the variable d represents the number of times feedback from another service provider customer disagreed with feedback from another service provider customer. In this manner, the more the service provider customer disagrees with other service provider customers, the lower the agreement score will be and, the more often feedback from the service provider customer agrees with feedback from other service provider customers, the higher the agreement score will be (with a limit of 1 that is achieved with full agreement).

It should be noted that agreement scores may be calculated in various ways. For example, the numbers for a and d, above, may be calculated on an IP address basis or an IP address set basis. For example, in some embodiments, feedback from a service provider customer about an IP address may be said to agree with feedback from another service provider customer when both service provider customers have indicated the same result (e.g., successful or unsuccessful reauthentication) after sessions moving from the same IP address. As another example, in some embodiments, feedback from a service provider customer about an IP address in an IP address set may be said to agree with feedback from another service provider customer when the service provider customers have indicated the same result with respect to IP addresses in the same IP address set (where the IP addresses for which feedback was provided by the respective service provider customers may be, but are not necessarily, the same).

For a service provider customer, the value of the reputation score for the service provider customer may be based at least in part on the number of movement reports and the agreement score so that, increases in either the number of movement reports or the agreement score correspond to agreements in the reputation score. For example, the reputation score for a service provider customer may be or may be otherwise based at least in part on the product of the number of movement reports and the reputation score. As another example, to keep the reputation score between zero and one, the reputation score may be based at least in part on the product of a function of the number of movement reports with a horizontal asymptote with a value of one, such as a function based on an arctangent of the number of movement reports, where the function is scaled to have a horizontal asymptote at one.

It should be noted the particular formulas and functions discussed above are provided for the purpose of illustration and that numerous variations are considered as being within the scope of the present disclosure. For example, variations of the formulas and different formulas may be used. Also, in some embodiments, reputation scores may be manually set. As an example, service provider customers who are trusted may have high reputation scores input into a system that operates in accordance with techniques described herein. As another example, service provider customers who have exhibited consistently high (i.e., above a threshold) agreement scores for longer than a threshold amount of time may have static high reputation scores. Other variations are also considered as being within the scope of the present disclosure.

As discussed above, a reputation score for a service provider customer may be used to determine how feedback from the service provider customer affects updates to a global classification score. For example, in embodiments where the reputation score is calculated to be between zero and one, the global classification score may be calculated such as described above with, however, contributions by a service provider multiplied by the corresponding reputation score. As an illustrative example, a global classification score for an IP address set may be a weighted average of customer-specific classification scores, where the weights are based at least in part on the reputation scores of the customers that have provided feedback regarding the IP address set.

Figure 10:
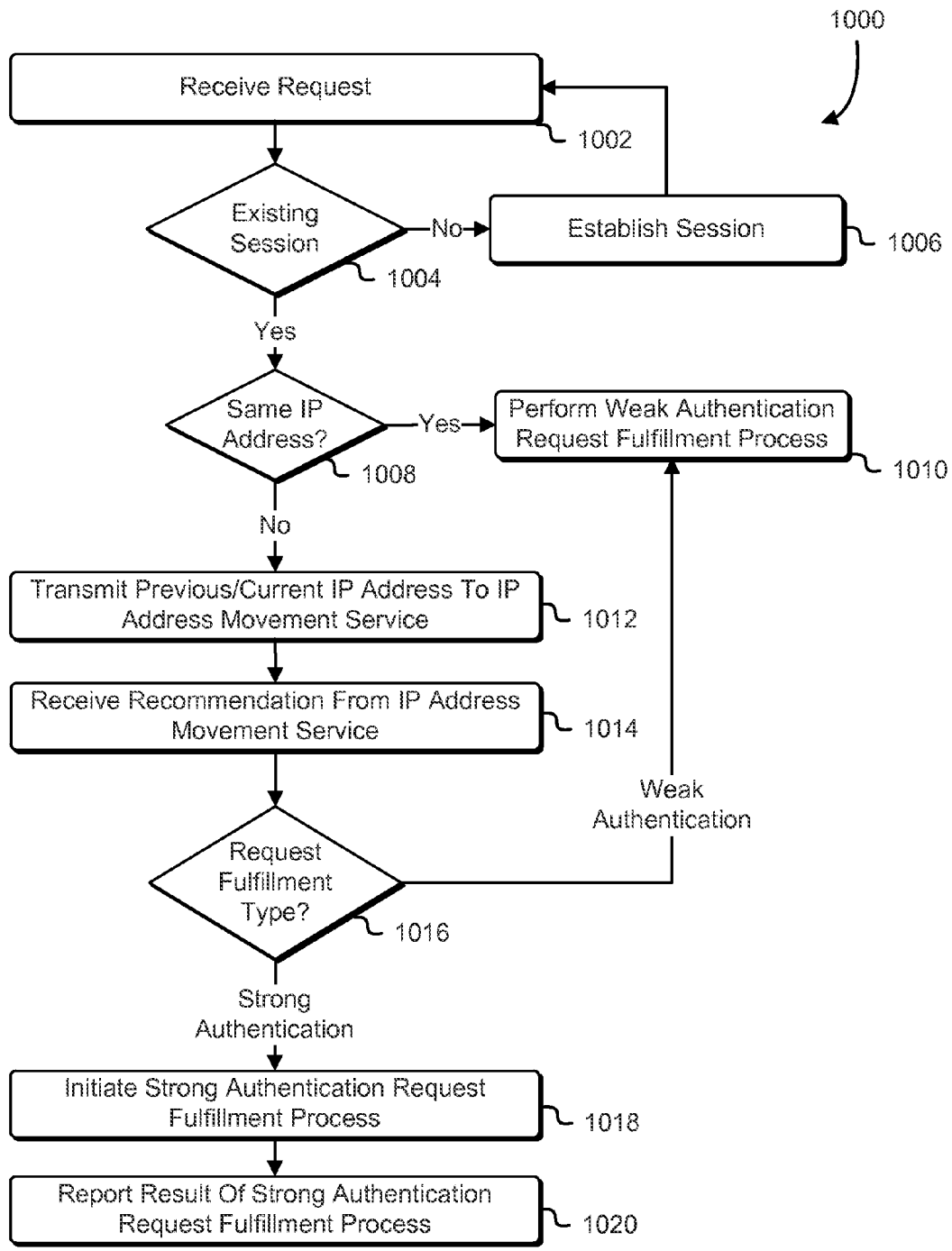
FIG. 10 shows an illustrative example of a process for utilizing a service in accordance with at least one embodiment.

As discussed, the various techniques described herein and variations thereof may be used to provide services to service provider customers (and other entities). FIG. 10 shows an illustrative example of a process 1000 that may be performed to utilize services of an IP address movement service, such as described above. For example, the process may be performed by a service provider customer, such as described above in connection with FIG. 7. The process may be performed, for instance, by a server of a service provider customer or a collection of computing devices that each are configured to perform one or more operations of the process 1000. As illustrated in FIG. 10, the process 1000 includes receiving a request. The request may be, for example, a request from a user device such as described above in connection with FIG. 7. The request may be, as an example, an HTTP request or other request that identifies a source IP address or other request source identifier. As noted, the techniques described herein may be applied for use with requests received in accordance with protocols other than HTTP.

Upon receipt 1002 of the request, the process 1000 may include determining 1004 whether the request was submitted on an existing session (i.e., whether the request corresponds to a session that has already been established). As discussed, the request may include a cookie that specifies an identifier of a session, and, therefore, the process 1000 may include determining whether the identifier provided corresponds to a currently active (e.g., non-expired) session, although other ways of determining whether the request was submitted on an existing session may also be used. If determined 1004 that the request was not submitted on an existing session, the process may include establishing 1006 a session which, in various embodiments, may include generating a new session or renewing an existing session. Establishing a session may be performed by, for example, providing an identifier of a session in a cookie or otherwise to the device that submitted the request and perform other operations, such as, if applicable, updating a session database used to maintain information about existing sessions.

If, however, it is determined 1004 that the request does correspond to an existing session, the process 1000 may include determining 1008 whether the request identifies a source IP address (current IP address) the same as a source IP address identified by a previous request on the same session (previous IP address), which may be a source IP address identified in the immediately preceding request on the same session or another previously submitted request. If determined 1008 that the request identifies a source IP address the same as a source IP address identified by a previous request on the same session, the process 1000 may include performing a weak authentication request fulfillment process, which may include performing a weak authentication process, as noted above, and fulfilling or not fulfilling the request in accordance with the outcome of the weak authentication process. (It should be noted that the determination of whether the request was submitted on an existing session may be or otherwise comprise performance of the weak authentication process and, as a result, the operation(s) involved in performance of the weak authentication process may not be repeated upon determining 1008 that the request identifies a source IP address the same as a source IP address identified by a previous request on the same session.)

If, however, if determined 1008 that that the request identifies a source IP address different from a source IP address identified by a previous request on the same session, the process may include submitting the current IP address and/or the previous IP address to an IP address movement service, such as described above in connection with FIG. 7. As noted, submitting 1012 the request may include transmitting, over a network, the request as an API call to the IP address movement service. The IP address movement service may process the request and provide, in response to the request, such as described above. The response may include information indicating whether the intra-session change from the previous IP address to the current IP address was unexpected. Accordingly, the process 1000 may include receiving 1014 a response to the request that includes a recommendation from the IP address movement service. As noted, the recommendation may be in various forms, such as a value that indicates whether the change from the previous IP address to the current IP address during the session was unexpected as determined based at least in part on the calculations of the IP address movement service.

In some embodiments, the recommendation is from more than two possible recommendations. As noted above, for instance, classification scores may be maintained for IP addresses in a database maintained by and/or accessible to the IP address movement service. The particular recommendation provided may be based at least in part on the score and/or the classification. As an illustrative example, recommendations may be provided to correlate with ranges of possible classification scores. For intra-session movement from IP addresses with scores strongly indicating fixed IP addresses, an authentication process may be recommended where the recommended authentication process is stronger than a different authentication process that would be recommended for an IP address with a classification score that, while still indicative of and having a corresponding fixed classification, less strongly indicates that the IP address is fixed rather than variable. For instance, in some instances multi-factor authentication may be recommended for some intra-session source IP address movement from some fixed IP addresses while single-factor authentication may be recommended for other intra-session source IP address movement from other fixed IP addresses.

As illustrated in the embodiment of FIG. 10, however, recommendations are from a set of two recommendations, corresponding to a recommendation to perform a strong authentication process and a recommendation to perform a weak authentication process. In an embodiment, the process 1000 includes determining 1016, based at least in part on the recommendation received 1014 from the IP address movement service, whether to perform a weak authentication process or to perform a strong authentication process. (Although, as noted, additional types of authentication processes may be selected from and the process 1000 may be modified accordingly.) If determined 1016 to perform a weak authentication process, the process 1000 may include performing 1010 the weak authentication process, such as described above. If determined 1016 to perform the strong authentication process, the process 1000 may include performing 1018 a strong authentication request fulfillment process, which may include fulfilling the request contingent on successful fulfillment of the strong authentication process, which may include performing reauthentication, as noted above.

Upon performance 1018 of the strong authentication request fulfillment process, the process 1000 may include reporting 1020 a result of performance of the strong authentication request fulfillment process. Reporting 1020 the result of performance of the strong authentication request fulfillment process may include submitting an API call to the IP address movement service (or another service separate from the IP address movement service that is configured to accept and utilize reporting results of performance of strong authentication processes). The API call may include an indication of whether performance of a strong authentication process was successful and other information, such as information authenticating the API call.

As with all processes described herein, variations of the process 100 are considered as being within the scope of the present disclosure. For example, a system performing the process 1000 may perform other operations in addition to those illustrated. For instance, a system performing the process 1000 may cache or otherwise store information provided in a response from the IP address movement service so that, when intra-session movement from an IP address that was already checked with the IP address movement service is detected, stored information may be referred to so as to not require contacting the IP address movement service an additional time and, for instance, incurring additional charges. Cached or otherwise stored information may be stored with a timestamp so that data that is determined to be stale (e.g., that has not been updated for a specified amount of time) may be flushed from the system, disregarded, weighted less during calculations and/or otherwise dealt with.

Further, while FIG. 10 shows a process 1000 that includes detecting intra-session IP source IP address movement, services of an IP address movement service may be used without detecting intra-session source IP address movement. For example, requests may be submitted to an IP address movement service for the purpose of collecting information, for system testing to determine how changes to network addressing will cause other systems to perform and/or for other reasons.

Figure 11:
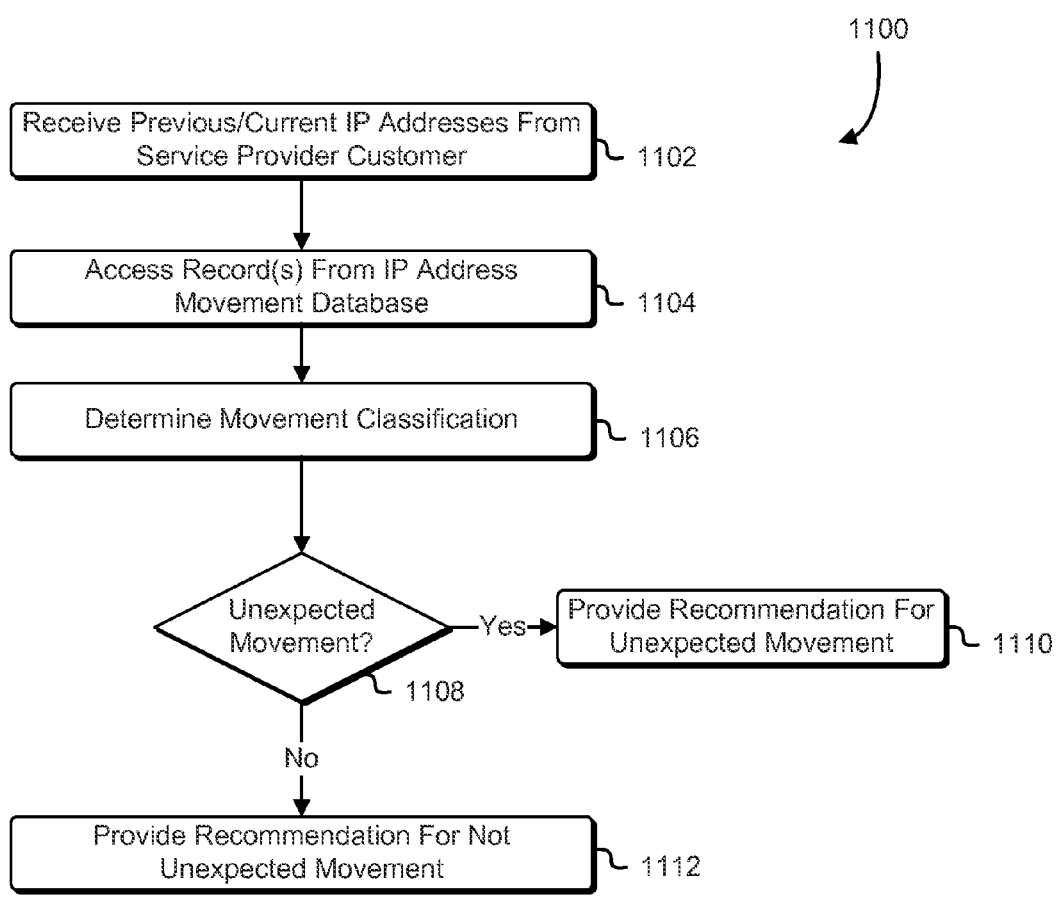
FIG. 11 shows an illustrative example of a process for providing a service in accordance with at least one embodiment.

FIG. 11 shows an illustrative example of a process 1000 for processing requests to an IP address movement service in accordance with at least one embodiment. The process 1100 may be performed by any suitable system, such as by an IP address movement service, such as described above. The process 1100 may be performed by a server of the IP address movement service or a collection of servers each playing a role in performance of the process 1100, such as a combination of a webserver and application server. As illustrated in FIG. 11, the process 1100 includes receiving current and/or previous IP address from a service provider customer (or, generally, from any entity). The IP address(es) may be received in any suitable manner, such as through an electronic request to the system performing the process 1100, where the request may be in the form of an API call transmitted over a network.

Upon receipt 1102 of the current and/or previous IP address(es), the process 1100 may include accessing 1104 one or more records from an IP address movement database, such as a database storing information in one or more tables such as described above. The record(s) may be accessed, for example, by submitting a query to the database where the query specifies the IP address(es). Once the database record(s) have been accessed, the process 1100 may include determining a movement classification. The movement classification may be determined in various ways in accordance with various embodiments. For example, in some embodiments, the movement classification corresponds to a classification of the previous IP address received 1102, where the classification may be a customer-specific classification unless one does not exist and, in that case, the classification may be a global classification. For example, intra-session movement away from an IP address classified as fixed may correspond to an unexpected movement classification. Similarly, intra-session IP address movement from an IP address classified as variable may correspond to a movement classification of not-unexpected.

In other embodiments, determination 1006 of the movement classification is more complex. For example, the movement classification may be based at least in part on information about the previous IP address and current IP address. As an example, IP addresses may be mapped to geographic locations and movement between geographic locations greater than a threshold distance may correspond to movement classifications of unexpected. As a similar example, movement between IP addresses of geographic locations greater than a threshold distance, where the time between requests corresponding respectively to the previous and current IP addresses is determined to be insufficient for travel between the locations, may correspond to movement classifications of unexpected. Other complex methods of determining the movement classification may be used, including variations such as described above.

Once the determination 1106 of the movement classification has been made, the process may include determining whether intra-session movement from the previous IP address (either any movement from the previous IP address or specific movement between the previous IP address and current IP address) is unexpected, where the classification may indicate directly whether the movement was unexpected. If determined 1108 that the intra-session IP address movement is unexpected, the process 1100 may include providing 1110 a recommendation corresponding to unexpected movement, where the recommendation may be in the form of a response to a request that was received. The recommendation may, for example, indicate a recommendation to perform a strong authentication process (e.g., requiring successful reauthentication) before fulfilling a request. The indication may be explicit or implicit (e.g., by indicating that the movement was unexpected). If determined 1108 that intra-session movement from the previous IP address was not unexpected, the process 1100 may include providing 1112 a recommendation corresponding to not-unexpected movement. The recommendation may be explicit or implicit, as described above, and may indicate, for example, that a request may be fulfilled upon successful performance of a weak authentication process.

Other operations not illustrated in FIG. 11 may also be performed. For example, the process may include authenticating a caller that provided the current and/or previous IP address, evaluating policy applicable to the request made by the caller, generating one or more log entries corresponding to the request and/or its fulfillment, generating one or more accounting records for use of the service and/or other operations.

Figure 12:
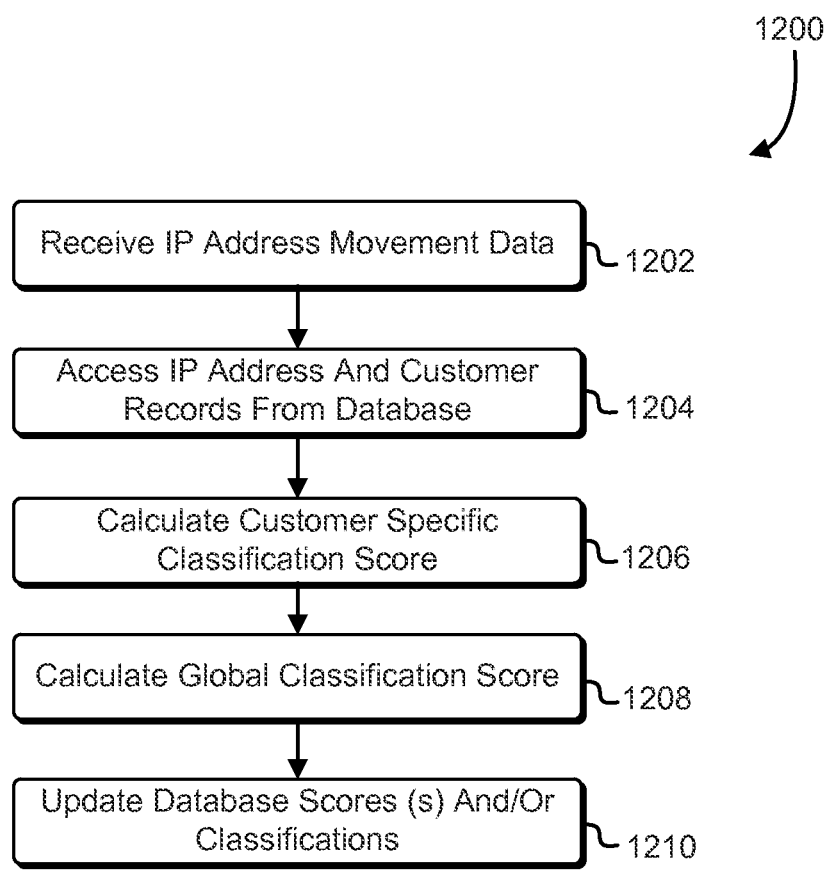
FIG. 12 shows an illustrative example of a process for updating a database in accordance with at least one embodiment.

As discussed, feedback regarding whether reauthentication and/or other strong authentication processes are fulfilled after detection of intra-session IP address movement may be received and used to update stored information used to process requests. Some techniques for updating stored data used to enable providing a service are discussed above. FIG. 12 shows an illustrative example of a process 1200 for maintaining stored information about IP addresses in accordance with various embodiments. The process 1200 may be performed by any suitable system, such as by an IP address movement service or another entity that operates an IP address movement database. The process 1200 may be performed by one or more servers each configured to perform one or more roles in performance of the process 1200.

In an embodiment, the process 1200 includes receiving 1202 IP address movement data. The IP address movement data may comprise data that indicates, for each IP address of one or more IP addresses, whether performance of a strong authentication process after detection of intra-session source IP address movement away from the IP address was successful. Receiving 1202 the IP address movement data may be performed in various ways in accordance with various embodiments. The information may include, for example, a previous IP address (where "previous" is used as above) and an indication of whether performance of the strong authentication process was successful. In some embodiments, the IP address movement data is provided by an entity that submitted a request to check whether intra-session source IP address movement from an IP address is unexpected. The IP address movement data may be provided each time a request is made for an IP address and/or collected and transferred in a batch. An API call to a system performing the process 1200 may be used as a way of providing the data, although any way of providing data is considered as being within the scope of the present disclosure.

In some embodiments, the IP address movement data for an IP address is received from an entity different from an entity that submitted a request to check whether intra-session source IP address movement from the IP address is unexpected. Referring to FIG. 7, in some embodiments, user devices provide IP address movement data. As an example, an IP address movement service may require that service provider customers insert tracking pixels (also referred to as clear pixels) in web pages accessed by user devices. When a user device loads a webpage received from a service provider, part of rendering the webpage may include transmitting (e.g., to the system performing the process 1200) a request for a tracking pixel. Because the request for the tracking pixel will typically indicate the same source IP address as the request for the webpage, the system performing the process 11200 may match, by source IP address, requests to check intra-session movement from previous IP addresses to the source IP address of a request for a tracking pixel. A webpage of the service provider customer provided as a result of successful reauthentication (generally, successful performance of a strong authentication process) may be required to include another, different, tracking pixel so that, when a request is submitted by the user device for the other tracking pixel, the system performing the process 1200 can match the request for the other tracking pixel to the current IP address specified in the request to check the previous IP address and, therefore, determine that the reauthentication process (generally, strong authentication process) was performed successfully. Other information may be passed in requests for tracking pixels, such as client and/or session identifiers or other information that enables the system performing the process 1200 to determine, based at least in part on information provided from user devices, whether strong authentication processes performed after detection of intra-session source IP address movement for which the strong authentication process was recommended.

Other ways of obtaining IP address movement data may also be used instead of or in addition to techniques described above. For example, in some embodiments, a service provider may provide authentication services. Users of the service provider customers' systems may, for example, communicate with the service provider to perform authentication processes using computing infrastructure of the service provider. Thus, users of a service provider customer system may communicate with the service provider for authentication to gain access to functionality of a service provider customer system. Users may, for instance, provide login credentials (e.g., username and password) to the service provider for verification and proof of verification may be provided to the service provider customer. In such embodiments, the service provider may match information in requests to an IP address movement service to authentication attempts made to an authentication service and/or may detect lack of attempts made to the authentication service in order to determine and utilize IP address movement data.

Returning to the illustrative embodiment of FIG. 12, upon receiving 1202 IP address movement data, the process 1200 may include accessing customer and/or IP address records from a database, such as from one or more databases utilizing one or more tables, such as described above. Accessing the record(s) may be performed in any suitable manner, such as by submitting a query configured to cause the database to provide the record(s). Information from the records may be used to calculate 1206 a customer-specific classification score and/or to calculate 1208 a global classification score, such as described above. While illustrated in a particular order, calculation of the customer-specific score and global score, if applicable, may be performed in a different order than illustrated, as may other operations described herein for some operations. If applicable, customer records which may include, for example, a reputation score, agreement score and/or other information may be used to calculate the global and/or customer-specific score(s). The database may then be updated 1210 based at least in part on the calculated score(s). Updating 1210 the database may include determining whether any classification(s) should change based at least in part on the calculated score(s), such as described above. The database may be used to process future requests.

As noted, numerous variations are considered as being within the scope of the present disclosure. For example, techniques may be employed to prevent using the database as an informational tool to build up one's own database. Requests, for instance, may be throttled to limit the rate at which data can be accessed from the database. Similarly, as noted above, techniques may be employed to prevent customers from unduly adversely affecting information provided to other customers. Other techniques, such as introducing entropy into responses provided from an IP address movement service, may limit the value of information obtained for the purpose of building one's own database.

Other variations are also considered as being within the scope of the present disclosure. For example, techniques described above relate to the calculation of classifications for IP addresses that are stored and used to respond to requests for recommendatory information involving intra-session source IP address movement. In some embodiments, classifications and corresponding recommendatory information may be generated dynamically, such as in response to requests that are received. In such embodiments, an IP Address movement database may store reporting information that is received over a period of time. The database may, for instance, store records that each indicates an IP address and whether authentication required after intra-session source change from the source IP address was successful. The records may also each, for an IP address, indicate the source IP address to which a source associated with a corresponding session changed. In other words, a record may indicate a previous source IP address for a session, a subsequent source IP address for the session, and a result of authentication required as a result of a change from the previous source IP address to the subsequent source IP address. As with all databases described herein, data may be organized in various ways in various embodiments, such as using one or more relational tables or in other ways.

Figure 13:
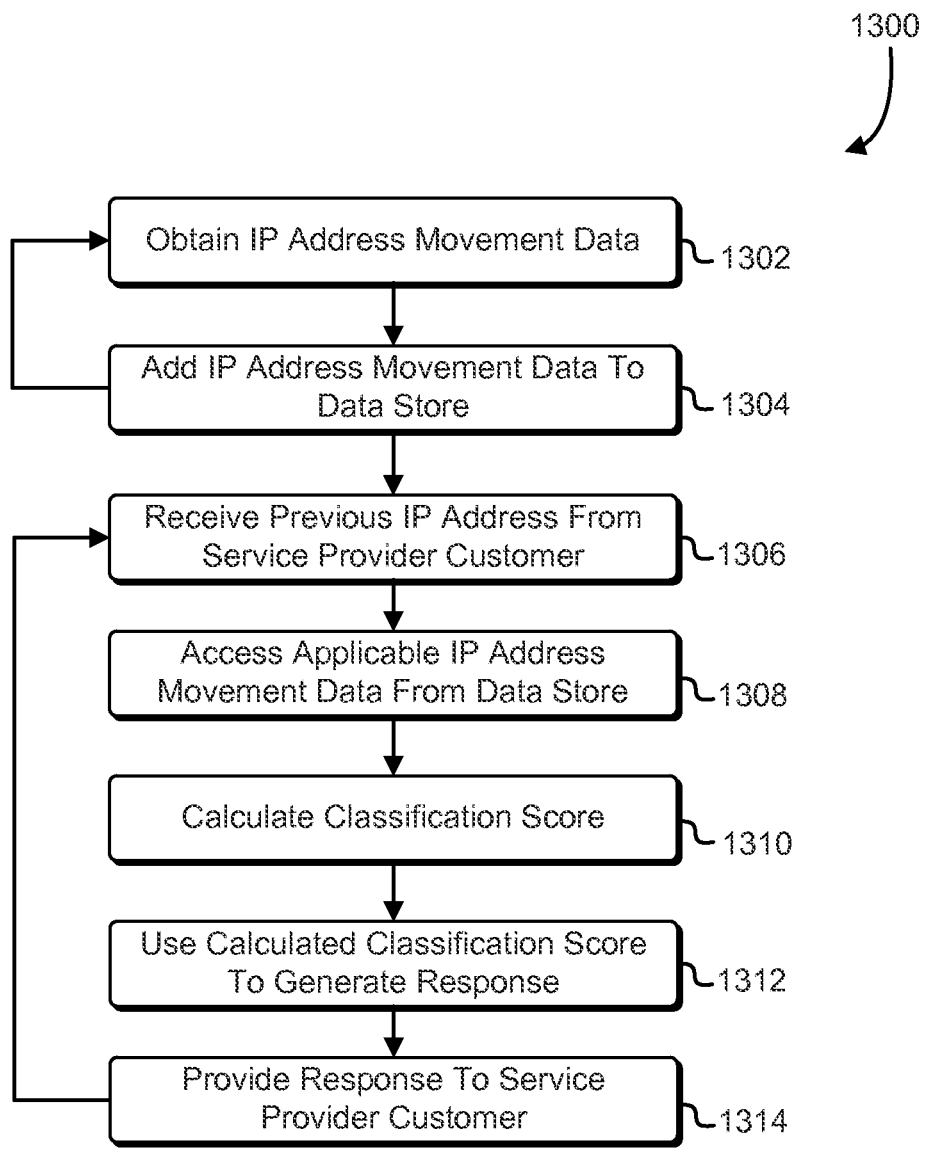
FIG. 13 shows an illustrative example of a process for providing a service in accordance with at least one embodiment.

FIG. 13 shows an illustrative example of a process 1300 for processing requests to an IP address movement service in accordance with at least one embodiment. The process 1300 may be performed by any suitable system, such as by an IP address movement service, such as described above. The process 1300 may be performed by a server of the IP address movement service or a collection of servers each playing a role in performance of the process 1300, such as a combination of a webserver and application server. As illustrated in FIG. 13, the process 1300 includes obtaining 1302 IP address movement data, such as information indicating a first IP address and information indicating whether an authentication process required as a result of a session moving from the first IP address to another IP address was performed successfully. The IP address movement data may also include a second IP address to which the session moved, such as described above. The IP address movement data may be obtained in any suitable manner, such as described above. For example, a service provider customer may provide a report to a service provider performing the process 1300. As another example, information may be received from a client of a service provider customer, such as described above. As yet another example, system performing the process 1300 may determine the IP address movement data and provide the data from one component of the system to another. For instance, the system may receive an indication that the authentication process was required as a result of intra-session IP address movement and, as a result of a threshold amount of time passing without an indication that the authentication process was performed successfully, may determine (i.e., operate on the assumption) that the authentication process was performed unsuccessfully. Generally, any suitable way of obtaining IP address movement data is considered as being within the scope of the present disclosure.

Upon receipt of IP address movement data, the process 1300 may include adding 1304 the obtained IP address movement data to a data store configured to store the IP address movement data. The data store may implement a database, such as described above, or may store data in other ways, including ways described above. Generally, any manner of storing the data so that the data is searchable for the purpose of performing other operations described in more detail below may be used. Further, to avoid unmanageable amounts of data, various techniques may be employed, such as by flushing stale data (i.e., data entered more than a threshold amount of time ago) and otherwise trimming the amount of data in the data store. In addition, data may be weighted in calculations so that older data is less influential on calculations than more recent data. As illustrated in FIG. 13, the above operations (and/or any other operations).

As with other processes described herein, the process 1300 may include receiving 1306 a previous IP address from a service provider customer, such as described above. As above, the previous IP address may be received with a current IP address to indicate intra-session IP address movement from the previous IP address to the current IP address. The previous IP address (and, in some embodiments, current IP address) may be received in a request from the service provider customer. To respond to the request, the process 1300 may include accessing 1308 applicable IP address movement data from the data store. The applicable data may, for instance, include records comprising reports of intra-session IP address movement and results of resulting required authentication processes, such as described above, or information based thereon. The applicable data may be the data associated with the previous IP address received from the service provider customer. In embodiments where the service provider customer provides a current IP address in addition to the previous IP address, the applicable data may include data corresponding to intra-session IP address movement between the previous IP address and current IP address and may exclude data associated with movement from the previous IP address but not to the current IP address, although both types of data may be used. The data may be accessed in any suitable manner, such as by searching the data store, submitting a query configured in accordance with a manner by which the data is organized, or otherwise identifying from a corpus of data, the applicable data. For example, if the data is organized in one or more XML files, an XPath query against the data may be executed.

Once the applicable data has been accessed 1308, the process 1300 may include calculating 1310, based at least in part on the accessed applicable data, a classification score for the previous IP address (or, for the previous IP address/current IP address pair), such as described above. A response may be generated 1312, based at least in part on the calculated 1310 classification score, such as described above. For example, the response may be generated to include recommendatory information regarding whether intra-session movement from the previous IP address (and/or intra-session movement from the previous IP address to the current IP address) is unexpected and/or whether performance of an authentication process should be required. The generated 1312 response may then be provided 1314 to the service provider customer, such as described above. As illustrated in FIG. 13, the operations of the process 1300 may be repeatedly performed as additional previous IP addresses (e.g., in requests) are received.

Figure 14:
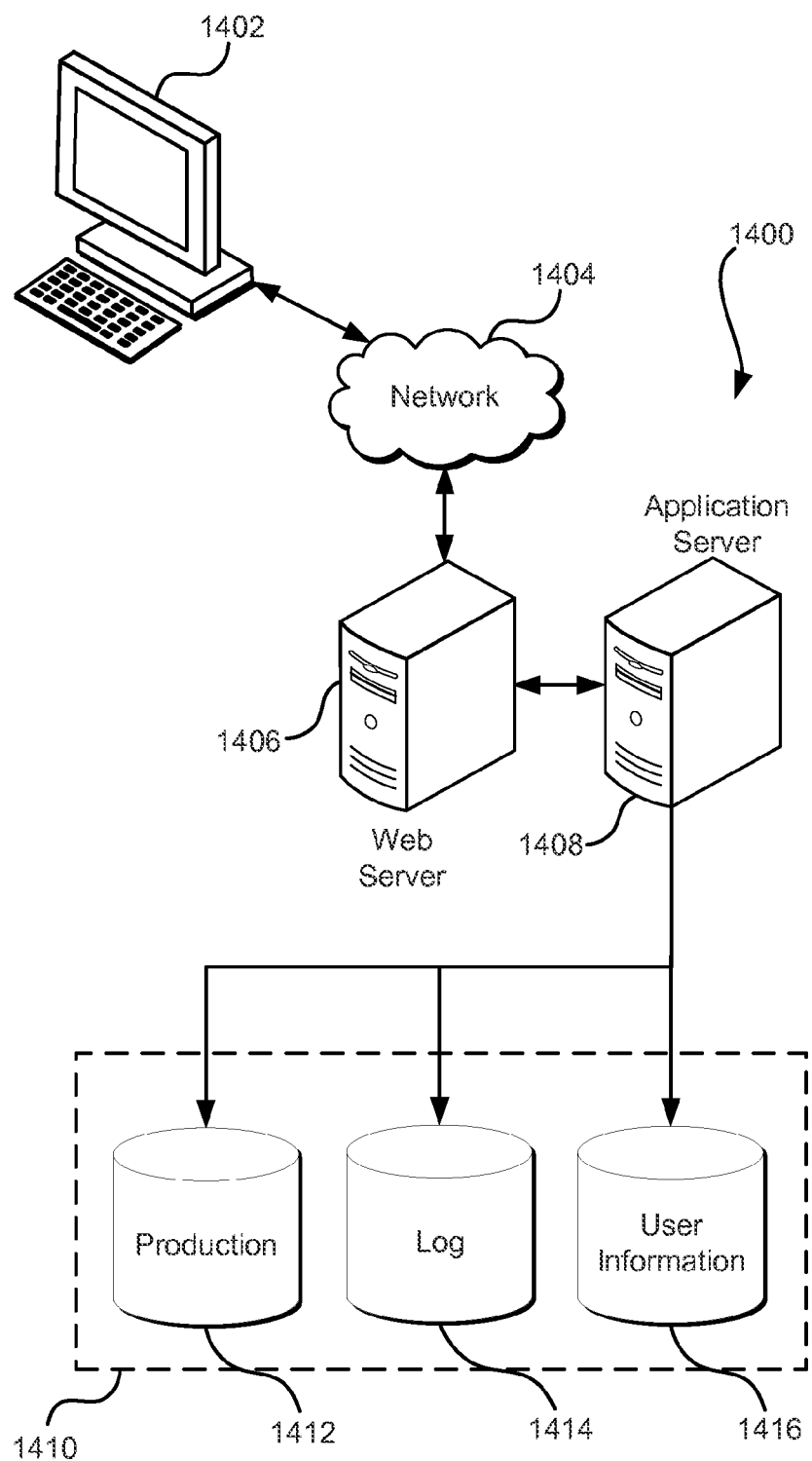
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hypertext Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems of a service provider, the one or more computer systems configured with executable instructions,
receiving, from a customer of the service provider, a request specifying a first Internet Protocol address and a second Internet Protocol address;
accessing, from a data store, one or more records associated with the first Internet Protocol address;
determining, based at least in part on the accessed one or more records, a classification of the first Internet Protocol address from a set of classifications that includes a fixed Internet Protocol address classification and a variable Internet Protocol address classification;
generating, based at least in part on the determined classification of the first Internet Protocol address, a response to the received request that indicates whether, during a session, a change in source address from the first Internet Protocol address to the second Internet Protocol address during a session is unexpected; and
transmitting the generated response to the customer.

2. The computer-implemented method of claim 1, wherein:
the response indicates that the change is unexpected; and
the method further comprises:
receiving an indication whether reauthentication, required by the customer as a result of the response, was successful; and
updating the data store based at least in part on the received indication.

3. The computer-implemented method of claim 2, wherein the indication is received from the customer.

4. The computer-implemented method of claim 2, wherein the indication is received from an entity different from the customer.

5. The computer-implemented method of claim 1, wherein the accessed one or more records include a first record with global information about the first Internet Protocol address and a second record with information about the first Internet Protocol address that is specific to the customer.

6. The computer-implemented method of claim 1, wherein:
the method further comprises accessing, from the data store, one or more records associated with the second Internet Protocol address; and
generating the response is further based at least in part on the accessed one or more records associated with the second Internet Protocol address.

7. A system, comprising at least one computing device configured to provide a service, the service configured to:
receive first information indicating whether performance of an authentication process was successful, wherein:
the authentication process was required as a result of a request on a session associated with a first network address indicating a source of a second network address; and
the request was received by another system;
update, based at least in part on the received information, a data store that, for each set of one or more network addresses of a plurality of sets of one or more network addresses, associates the set of one or more network addresses with second information obtained based at least in part on one or more reports of results of required authentication subsequent to intra-session source network address change; and
use the updated data store to respond to a request to provide recommendatory information regarding the first network address.

8. The system of claim 7, wherein the information is received from a customer of a service provider that operates the system.

9. The system of claim 7, wherein:
the second information comprises classifying information;
the classifying information includes both global classifying information and customer-specific classifying information; and
the recommendatory information is based at least in part on the customer-specific classifying information.

10. The system of claim 7, wherein the first information is received from a device that submitted the request on the session.

11. The system of claim 7, wherein:
the session was initiated as a result of successful performance of a first authentication process; and
the authentication process includes repeating the first authentication process.

12. The system of claim 7, wherein:
the first information comprises classifying information that includes both global classifying information and customer-specific classifying information; and
the information is received from a customer of a service provider that operates the system; and
the service is configured to update the global classifying information based at least in part on information recorded based at least in part on one or more past instances of the customer having provided information about one or more network addresses.

13. The system of claim 7, wherein:
the first information comprises both global information and customer-specific information; and
the information is received from a customer of a service provider that operates the system; and
the service is configured to use the first information to, in response to the request, calculate a classification for the first network address; and
the recommendatory information is based at least in part on the calculated classification.

14. A non-transitory computer-readable storage medium having stored thereon instructions that, when executed by one or more processors of a computer system, cause the computer system to:

receive, over a network, a request specifying a first request source identifier;

make a determination, based at least in part on a classification of the first request source identifier from a set of classifications that includes a fixed request source identifier classification and a variable request source identifier classification, whether a change in request source identifier from the first request source identifier during a session is unexpected; and generate, based at least in part on the determination, a response to the received request; and provide the generated response.

15. The non-transitory computer-readable storage medium of claim 14, wherein the instructions further include instructions that, when executed by the one or more processors, cause the computer system to:

receive information indicating whether performance of an authentication process after the change was successful; and update stored information about the first source identifier based at least in part on the received information.

16. The non-transitory computer-readable storage medium of claim 14, wherein the instructions that cause the computer system to determine whether a change in source identifier from the first source identifier during a session is unexpected causes the computer system to query a database of classifications of sets of source identifiers to obtain the classification of the first source identifier.

17. The non-transitory computer-readable storage medium of claim 14, further comprising instructions that, when executed by the one or more processors, cause the computer system to:

receive information indicating whether an authentication process required as a result of the response was successfully completed;

updating a customer-specific classification score for the first request source identifier; and updating another classification score for the first request source identifier differently than for the customer-specific classification score for the first request source identifier.

18. The non-transitory computer-readable storage medium of claim 14, wherein the instructions cause the computer system to determine whether a change in request source identifier from the first request source identifier during a session is unexpected further based at least in part on a second request source identifier associated with the session after the change.

19. The non-transitory computer-readable storage medium of claim 14, wherein:

the system is operated by a service provider; and the request is received from a customer, of multiple customers, of the service provider.

20. The non-transitory computer-readable storage medium of claim 14, further comprising instructions that, when executed by the one or more processors, cause the computer system to:

receive, from the customer, information indicating whether an authentication process required as a result of the response was successfully completed; and update stored information about the first request source identifier based at least in part on statistical information about the customer calculated based at least in part on past reporting by the customer of indications whether the authentication process was successful.

21. The non-transitory computer-readable storage medium of claim 14, wherein:

the instructions further comprise instructions that, when executed by the one or more processors, cause the computer system to maintain information about the first request source identifier based at least in part on statistical information about the customer calculated based at least in part on past reporting by the customer of indications whether the authentication process was successful; and the statistical information is based at least in part on information about performance of the authentication process performed as a result of detected changes in request source identifier from the first request source identifier during sessions provided by other customers of the service provider.

22. The non-transitory computer-readable storage medium of claim 14, further comprising instructions that, when executed by the one or more processors, cause the computer system to:

make a determination as a result of not receiving information indicating whether an authentication process required as a result of the response was successfully completed; and update the data store in accordance with the determination.

* * * * *